United States Patent [19]

Hidaka et al.

[11] Patent Number: 5,096,659

[45] Date of Patent: Mar. 17, 1992

[54] REACTOR CONTAINMENT VESSEL

[75] Inventors: Masataka Hidaka; Shigeo Hatamiya, both of Hitachi; Terufumi Kawasaki, Katsuta; Toru Fukui; Hiroaki Suzuki, both of Hitachi; Yoshiyuki Kataoka, Ibaraki; Ryuhei Kawabe, Hitachi; Michio Murase, Mito; Masanori Naitoh, Hitachi, all of Japan

[73] Assignee: Hitachi, Ltd., Tokyo, Japan

[21] Appl. No.: 436,194

[22] Filed: Nov. 14, 1989

[30] Foreign Application Priority Data

Nov. 16, 1988 [JP] Japan .................. 63-287709

[51] Int. Cl.$^5$ .............................................. G21C 13/00
[52] U.S. Cl. ........................... 376/283; 376/299; 376/293
[58] Field of Search ............... 376/283, 282, 281, 293, 376/299, 273

[56] References Cited

U.S. PATENT DOCUMENTS

| | | | |
|---|---|---|---|
| 3,115,450 | 12/1963 | Schanz | 376/283 |
| 3,454,466 | 7/1969 | Pitt et al. | 376/283 |
| 4,950,448 | 8/1990 | Gou et al. | 376/283 |

FOREIGN PATENT DOCUMENTS

| | | | |
|---|---|---|---|
| 4640 | 2/1967 | Japan . | |
| 107495 | 9/1977 | Japan . | |
| 21595 | 1/1988 | Japan . | |
| 212892 | 9/1988 | Japan | 376/283 |
| 229390 | 9/1988 | Japan . | |
| 115793 | 4/1990 | Japan | 376/283 |

*Primary Examiner*—Daniel D. Wasil
*Attorney, Agent, or Firm*—Antonelli, Terry, Stout & Kraus

[57] ABSTRACT

A reactor containment vessel comprises typically a reactor pressure vessel housed in a dry well of the reactor containment vessel, a vent passage through which steam in the dry well is introduced into coolant accommodated in a pressure suppression chamber of the reactor containment vessel, a closed space formed at a position lower than the level of the normal liquid surface of the coolant, a first passage having an inlet opened into the pressure suppression chamber at a level higher than that of the normal liquid surface of the coolant and an outlet opened into the closed space, and a second passage communicating between the closed space and the dry well through a counter flow preventing arrangement for checking the flow directed toward the closed space, and therefore, noncondensable gas and liquid accumulated in the pressure suppression chamber are discharged into the dry well the pressure in which is higher than that in the pressure suppression chamber by making use of a difference in water head increased due to increase of the liquid while allowing fluid to be condensed to newly flow into the pressure suppression chamber from the dry well so as to be condensed, over a long cooling period after the occurrence of an accident of piping fracture in the reactor containment vessel. Owing to condensation, the pressure in the reactor containment vessel can be reduced, and moreover, fluid can make a natural circulation in a closed circuit passing through the dry well, the pressure suppression chamber and the closed space in order without flowing outside the circuit.

27 Claims, 24 Drawing Sheets

REACTOR CONTAINMENT VESSEL

BACKGROUND OF THE INVENTION

The present invention relates to equipments for promoting condensation of steam discharged into a reactor containment vessel and for suppressing pressure rise in the reactor containment vessel and to a pressure-reducing method at a time of emergency in the containment vessel.

Conventional boiling-water reactors generally have such a hazard that if an accident is assumed to have occurred in which the piping is fractured in the reactor container vessel, high-temperature and high-pressure steam spouting from the fracture into the containment vessel causes the pressure in the containment vessel to rise. In the conventional boiling-water reactor, therefore, in order to suppress the pressure rise in the containment vessel, it has been attempted to introduce the steam having spouted into the containment vessel into a coolant (water of a suppression pool) stored in a pressure suppression of the containment vessel so as to condense it. However, owing to an inactive noncondensable gas which is filled in the containment vessel in normal operating condition of the rector, the pressure in the containment vessel is increased and the condensing characteristic of the steam is deteriorated.

To cope with the above problem, there have been proposed a method that the containment vessel is filled with steam, i.e. water vapor, in place of the inactive noncondensable gas, in normal operating condition as disclosed in Japanese Patent Examined Publication No. 42-4640, an apparatus that the non-condensable gas accumulated in the pressure suppression is allowed to escape to outside a primary containment vessel so as to suppress the pressure rise as disclosed in Japanese Patent Unexamined Publication No. 63-21595, and another apparatus that a fan is used to discharge the noncondensable gas accumulated in the pressure suppression of the container vessel to a dry well so as to suppress the pressure rise in the pressure suppression as disclosed in Japanese Patent Examined Publication No. 56-21118.

However, these prior arts have many problems to be solved.

The problems are as follows.

The conventional method that the containment vessel is filled with steam at all times is lacking in reliability since there is a possibility that machines and instruments in the containment vessel suffer corrosion and trouble due to high humidity. Meanwhile, in the conventional apparatus which employs the fan for exhaust, since the high-temperature and high-pressure fluid is released by the dynamically or actively operated machine at the time of the occurrence of an accident, the reliability of the apparatus is lowered and the cost of the apparatus is raised. Further, in the conventional apparatus designed to allow the non-condensable gas accumulated in the pressure suppression to escape to outside the primary containment vessel, since it is necessary to install a secondary containment vessel serving to receive the exhaust gas in addition to the existing containment vessel, the containment vessel is made to become extremely large in correspondence to the enlargement of the pressure suppression.

SUMMARY OF THE INVENTION

Accordingly, an object of the present invention is to provide a structure of a small-sized reactor containment vessel or primary containment vessel having high reliability which is capable of suppressing the pressure in the reactor containment vessel, and to a pressure suppressing method.

According to the present invention, there can be obtained a reactor containment vessel comprising: a reactor pressure vessel housed in a dry well of the reactor containment vessel; a vent passage through which steam in the dry well is introduced into coolant accommodated in a pressure suppression of the reactor containment vessel; a closed space formed at a position lower than the level of the normal liquid surface of the coolant; a first passage having an inlet opened into the pressure suppression at a level higher than that of the normal liquid surface of the coolant and an outlet opened into the closed space; and a second passage communicating between the closed space and the dry well through a counter flow preventing means for checking the flow directed toward the closed space, a reactor containment vessel in which steam released into a dry well is introduced into coolant in a pressure suppression through a passage so as to be condensed therein and which comprises a first passage through which an increment of coolant due to condensation is introduced from the pressure suppression into a separate chamber provided at a lower position than the pressure suppression, and a second passage communicating between the separate chamber and the dry well through a counter flow preventing means serving to allow the coolant to flow from the separate chamber into the dry well in accordance with a difference in hydrostatic head between the coolant water level in the pressure suppression and the water level in the separate chamber, and an emergency pressure reducing method in a reactor containment vessel, comprising the steps of: introducing steam released to a dry well into coolant in a pressure suppression through a vent passage; condensing the steam in the coolant; introducing the coolant increased due to condensation by the action of gravity and gas in the pressure suppression by the action of both or one of rise of the water level of the coolant increased due to condensation in the pressure suppression and pressure rise in the pressure suppression due to accumulation of steam and gas, from the pressure suppression into a separate chamber formed at a lower position than the pressure suppression; opening a counter flow preventing means which allows the coolant to flow from the separate chamber toward the dry well in response to a difference in hydrostatic head between the water level of coolant in the pressure suppression and the water level in the separate chamber; and returning the gas and coolant in the separate chamber into a lower part of the dry well.

BRIEF DESCRIPTION OF THE DRAWINGS

The above-mentioned and other objects and advantages as well as above-mentioned and other features of the invention will be made clearer by the description hereinafter with reference to drawings in which.

DETAILED DESCRIPTION PREFERRED EMBODIMENT

Figure 1:
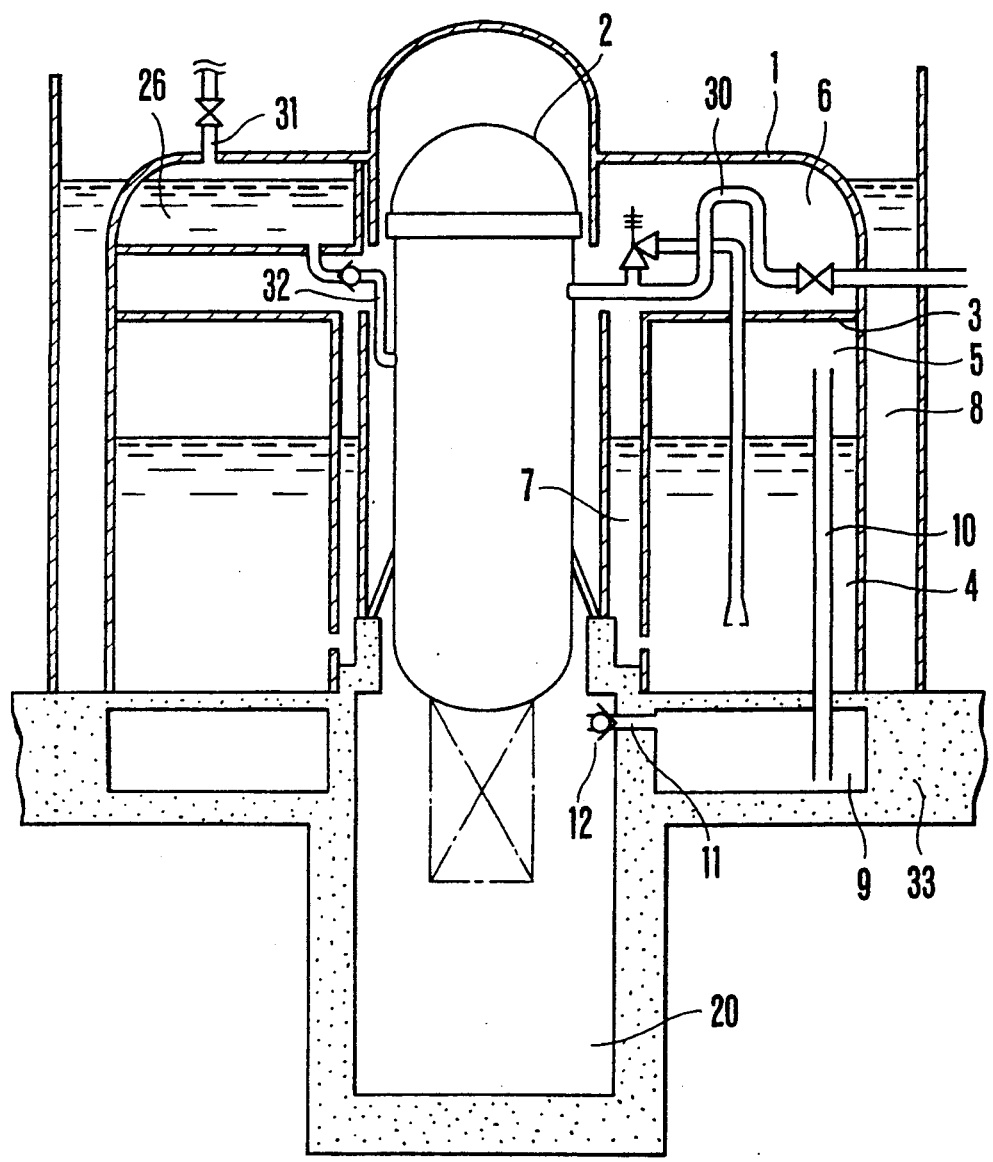
FIG. 1 is a vertical sectional view of a reactor containment vessel in accordance with a first embodiment of the present invention.

Fundamental structure and operation of each embodiment of the present invention to be explained later in detail is as follows.

Namely, a reactor containment vessel is constituted by a dry well area in which a reactor pressure vessel is accommodated and a pressure suppression area communicated with the dry well area by means of a vent pipe. The pressure suppression chamber or pressure suppression is constituted by a suppression pool serving as a coolant water area and a wet well which is a space defined above the water surface of the coolant. An open end of the vent pipe is immersed in the coolant.

If an accident of fracture of the piping connected to the reactor pressure vessel which serves as a steam generating section occurs in the reactor containment vessel having the above structure, high-temperature and high-pressure steam is released from the fractured portion. During a long term cooling after the occurrence of the accident of fracture of the piping, the pressure in the containment vessel can be expressed as the sum of the partial steam pressure, the partial noncondensable gas pressure, and the hydrostatic pressure in the vent pipe through which steam is forced into the suppression pool from the dry well of the reactor containment vessel.

At the time of an accident of breakage of the piping, inactive noncondensable gas which is filled in the containment vessel in normal operating condition and steam flow together from the dry well into the suppression pool through the vent pipe(s) so that steam is condensed. However, part of steam which have not been condensed in the pool and the inactive noncondensable gas are accumulated in the wet well. On the other hand, condensation of steam results in an increase of the quantity or amount of coolant in the suppression pool so that the level of water in the pool is raised and the volume of the wet well is reduced. At this time, steam and noncondensable gas accumulated in the wet well flow into a space in another chamber through a passage communicating between the wet well and the space. As the water level in the suppression pool is raised to become higher than an open end of the passage on the wet well side, the pool water flows into the space so as to make the pressure in the space higher than the pressure in the dry well due to the hydrostatic head which corresponds to the difference between the water level in the suppression pool and the water level in the space. In consequence, a check valve disposed in a passage communicating between the space and the dry well is opened to allow the noncondensable gas and steam to be discharged to the dry well by an amount equal to the volume of the suppression pool water flowing into the space. This contributes to reduction of the partial steam pressure and the partial noncondensable gas pressure in the wet well.

Further, even after the space is filled with the suppression pool water, increment water in the suppression pool is still discharged to the dry well through the passage communicating between the wet well and the space, the space, and then the passage communicating between the space and the dry well, so that the water level in the pool can be maintained constant and, accordingly, decrease in the volume of the wet well and pressure rise attributable to the rise of the water level can be suppressed.

Description will be given below of various embodiments of the present invention concretely.

Now, a first embodiment of the present invention will be explained with reference to FIGS. 1, 2a, 2b and 2c.

A reactor containment vessel 1 is surrounded by an outer peripheral pool 8 in which a coolant is accommodated. This reactor containment vessel 1 comprises a dry well 6 in which a reactor pressure vessel 2 is disposed, and a pressure suppression chamber or pressure suppression 3 accommodating cooling water. The pressure suppression 3 is constituted by a suppression pool 4 serving as cooling water area and a wet well 5 serving as its steam phase area. The dry well 6 and the suppression pool 4 are communicated with each other by means of vent pipes 7.

Inside a foundation 33 on which the reactor containment vessel 1 is installed, a space 9 as a separate chamber is provided at a position below the level of water surface in the suppression pool 4.

The wet well 5 and the space 9 are communicated with each other by means of a tubular passage 10. The space 9 is also communicated with the dry well 6 by means of a passage 11 through a check valve 12. The check valve 12 operates to check or prevent the flow directed toward the space 9.

A main steam pipe 30 is connected to the reactor pressure vessel 2 for introducing high-temperature and high-pressure steam generated in the reactor pressure vessel 2 toward a generating turbine. The main steam pipe 30 is led to the outside of the reactor containment vessel 1.

A high pressure water tank 26 is formed by making use of a portion of the upper wall surface of the reactor containment vessel 1 so as to store the coolant therein. The high pressure water tank 26 is connected to the inside of the reactor pressure vessel 2 by means of a feed water line 32 which has a check valve disposed in the middle thereof. A pipeline 31 is connected to the high pressure water tank 6 for supplying high-pressure inactive noncondensable gas into the high pressure water tank 26. By this arrangement, at the time of an accident of fracture of the piping, pressure is applied to the high pressure water tank 26 through the pipeline 31 so as to allow the coolant in the high pressure water tank 26 to be supplied into the reactor pressure vessel 2 in which the amount of coolant has been reduced.

Figure 2A:
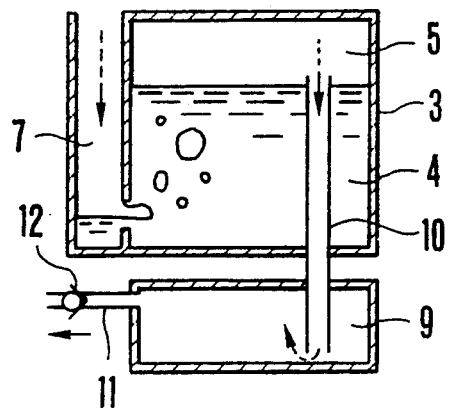
FIG. 2a, 2b and 2c are sectional views of a portion of the reactor containment vessel according to the first embodiment, showing in sequence flows of fluid at the time of the occurrence of an accident.
Figure 2B:
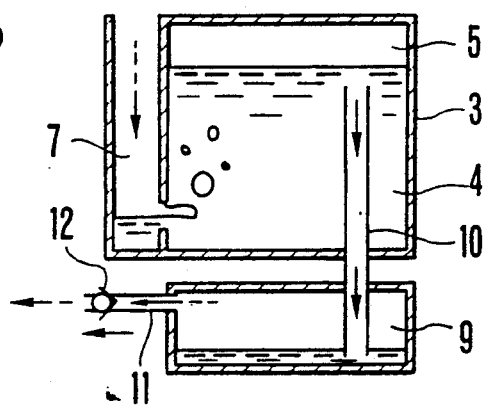
Figure 2C:
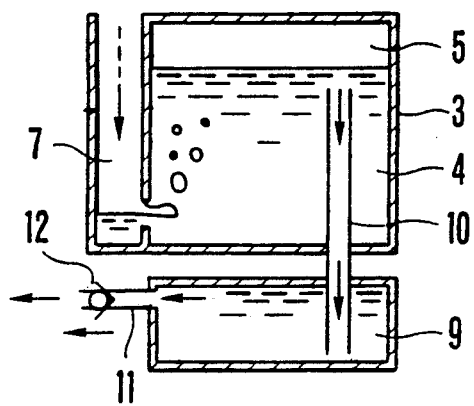

The principle of operation of this embodiment will be described with reference to FIGS. 2a, 2b and 2c. In the drawings, full-line arrows show the flow of liquid phase while broken-line arrows show the flow of gas phase.

The reactor containment vessel 1 is filled with an inactive noncondensable gas such as nitrogen in normal operating condition. However, in case of an accident of fracture of the piping in which the piping connected to the reactor pressure vessel is fractured in the reactor containment vessel, high-temperature and high-pressure steam is released from the fractured portion into the dry well 6, thereby increasing the temperature and the pressure in the dry well 6 to higher levels. The high-temperature and high-pressure steam thus released and the inactive noncondensable gas flow together into the suppression pool 4 through the vent pipe 7. The greater part of steam is condensed in water in the suppression pool 4, while the remaining part of steam not to have been condensed and the noncondensable gas are accumulated in the wet well 5.

In this case, due to the steam pressure and the noncondensable gas pressure, the pressure in the wet well 5 is made higher than that in the space 9. Accordingly, the noncondensable gas and steam in the wet well 5 are caused to flow into the space 9 (as shown in FIG. 2a).

On the other hand, steam is condensed in the water in the suppression pool 4 so that the quantity of water as coolant in the suppression pool 4 is increased and, accordingly, the water level in the suppression pool 4 rises. As the water level in the suppression pool 4 becomes higher than an open end (inlet) of the passage 10 on the side of the wet well 5, water flows downwardly by gravity through the passage 10 into the space 9 so as to be pooled therein. As the water level in the space 9 becomes higher than another open end (outlet) of the passage 10 on the side of the space 9, a hydrostatic head corresponding to the difference between the water level in the suppression pool 4 and the water level in the space 9 is applied to the closed space 9 so that the pressure in the space 9 is increased to become higher than that in the dry well 6. In consequence, the pressure in the space 9 acts to open the check valve 12 disposed between the space 9 and the dry well 6 so as to allow the noncondensable gas and steam flowed into the space 9 to be discharged to the dry well through the passage 11 (as shown in FIG. 2b). Then, as the quantity of water in the suppression pool 4 increases, the coolant flows into the space 9. After the space 9 is filled up with water, the check valve 12 is opened by the action of the hydrostatic head corresponding to the difference between the water level in the suppression pool 4 and the water level in the space 9 so that the increment of water in the suppression pool 4 is discharged to the dry well 6 through the passage 11 (as shown in FIG. 2c). In this way, the water level in the suppression pool 4 is maintained constant to thereby prevent reduction of the volume of the wet well 5.

Meanwhile, although the temperature in the reactor containment vessel 1 is elevated, since the reactor containment vessel 1 is in contact with cooling water in the outer peripheral pool 8, the reactor containment vessel 1 is cooled and hence the temperature therein is lowered, thereby decreasing the pressure in the reactor containment vessel 1 which depends upon the temperature. This also contributes to suppression of pressure rise in the reactor containment vessel 1 as well.

According to the present embodiment, the following effects can be attained. Namely, the non-condensable gas and steam accumulated in the wet well can be discharged to the dry well without making use of any dynamically-operated machine, the increment of water in the suppression pool attributable to the condensation of steam is discharged to the dry well so that reduction of the volume and increase of the pressure of the wet well can be prevented so as to allow it to be restored to its original condition in which it can easily perform the pressure suppressing function, and accordingly, the pressure rise in the reactor containment vessel can be suppressed within a small space. Further, there is a tendency that the peak pressure after the occurrence of the accident develops in the pressure suppression, and however, the pressure in the pressure suppression is circulatingly transmitted through the space 9 so as to be distributed over the reactor container vessel to thereby lower the peak level of the pressure, thus assuring the safety and an economical pressure-proof design. In addition, temperature is also circulatingly transferred through the space 9 to the reactor container vessel so as to eliminate the peak, and therefore, the pressure depending upon the temperature can be also reduced and an economical heat-proof design can be assured.

A second embodiment of the present invention will be describe below with reference to FIGS. 3, 4a, 4b, 4c, 4d and 5.

The second embodiment is a modification of the first embodiment, and therefore, detailed description thereof is omitted while denoting the same component parts as those of the first embodiment by the same reference numerals as in the latter.

In addition to the embodiment shown in FIG. 1, a siphon 13 communicating between the space 9 and the dry well 6 and having a check valve 14 is provided. In this case, the height of the siphon 13 on the side of the dry well 6 is designed to be higher or greater than the blowing hydrostatic head of the vent pipe 7, and the passage area thereof larger than that of the passage 10.

Operation of the present embodiment will be described with reference to FIGS. 4a, 4b, 4c and 4d.

Figure 4A:
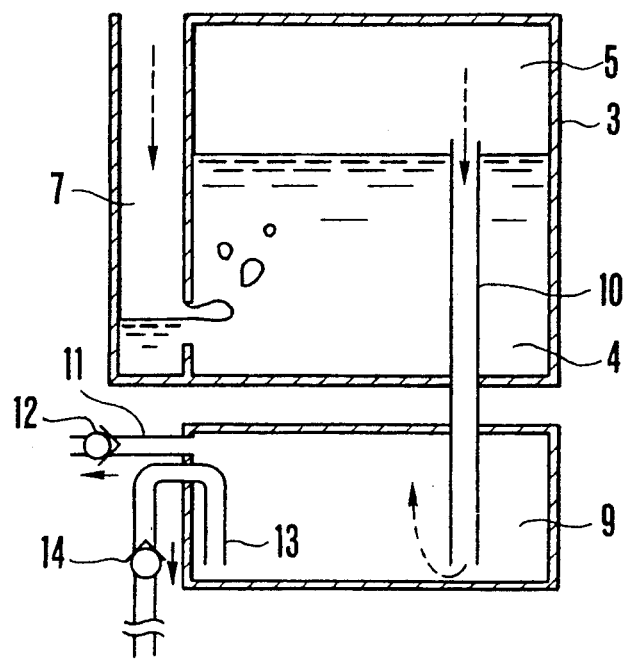
FIGS. 4a, 4b, 4c and 4d are sectional views of a portion of the reactor containment vessel according to the second embodiment, showing in sequence flows of fluid at the time of the occurrence of an accident.

As the pressure in the wet well 5 increases to become higher than that in the space 9 owing to the steam pressure and the noncondensable gas pressure, the noncondensable gas and steam in the wet well 5 are caused to flow into the space 9 (as shown in FIG. 4a).

Since steam is condensed in the water in the suppression pool 4, the quantity of water in the suppression pool 4 is increased so that the water level in the suppression pool 4 rises. As the water level in the suppression pool 4 becomes higher than the open end of the passage 10 on the side of the wet well 5, water flows into the space 9 through the passage 10 so as to be pooled therein. As the water level in the space 9 becomes higher than the open end of the passage 10 on the side of the passage 9, a hydrostatic head corresponding to the difference between the water level in the suppression pool 4 and the water level in the space 9 is applied to the space 9 so that the pressure in the space 9 is increased to become higher than that in the dry well 6. In consequence, noncondensable gas and steam flowed into the space 9 are made to be discharged to the dry well 6 through the passage 11 which communicates between the space 9 and the dry well 6 and has the check valve 12 (as shown in FIGS. 4b).

In proportion as the quantity of water in the suppression pool 4 increases, water flows into the space 9. When the water level in the space 9 rises to a level higher than the uppermost portion of the siphon 13, water in the space 9 moves downwards through the siphon 13 to open the check valve 14 so as t be discharged to the dry well 6 (as shown in FIG. 4c). At this time, the pressure in the space 9 is reduced according to the discharge of water from the space 9 due to siphon effect by an amount corresponding to the difference between the water level in the space 9 and the hydrostatic head of an open end of the siphon 13 on the side of the dry well 6. As a result, water present around the open end of the passage 10 on the side of the wet well 5 is rapidly sucked into the space 9 and, accordingly, the water level in the suppression pool is lowered. Then, non-condensable gas and steam are allowed to flow by suction from the wet well 5 into the space 9 (as shown in FIG. 4d).

Figure 4B:
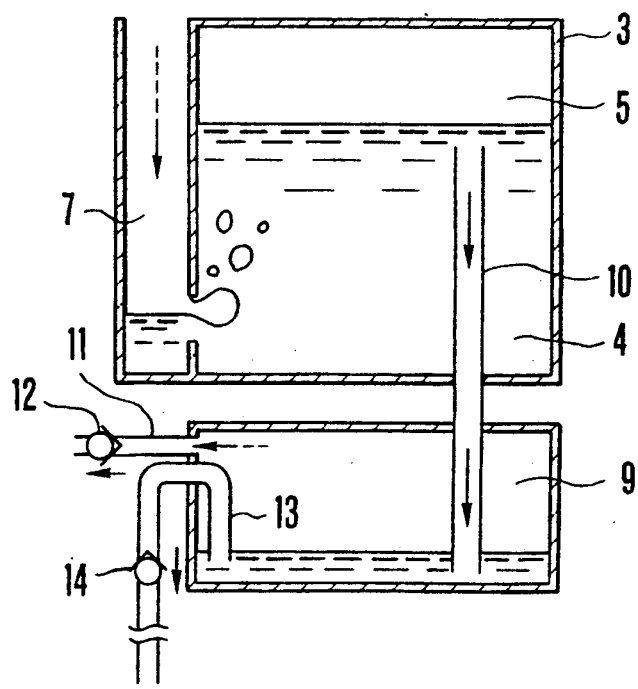
Figure 4C:
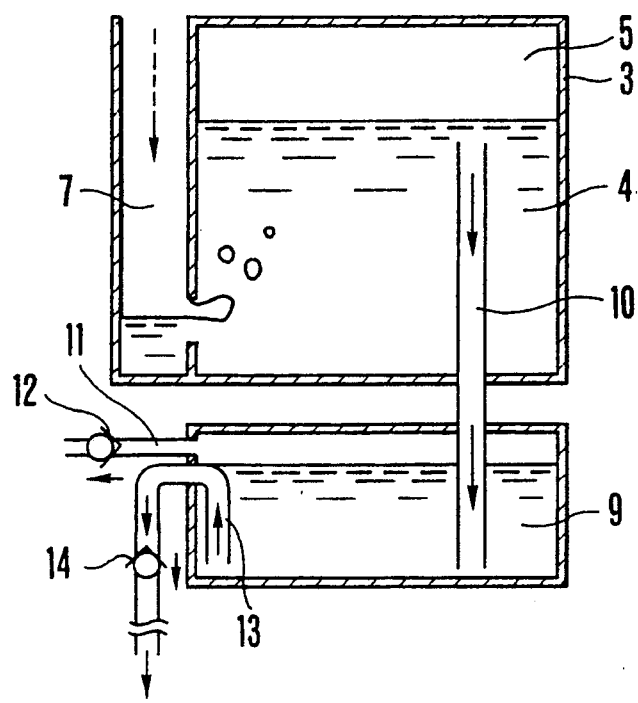
Figure 4D:
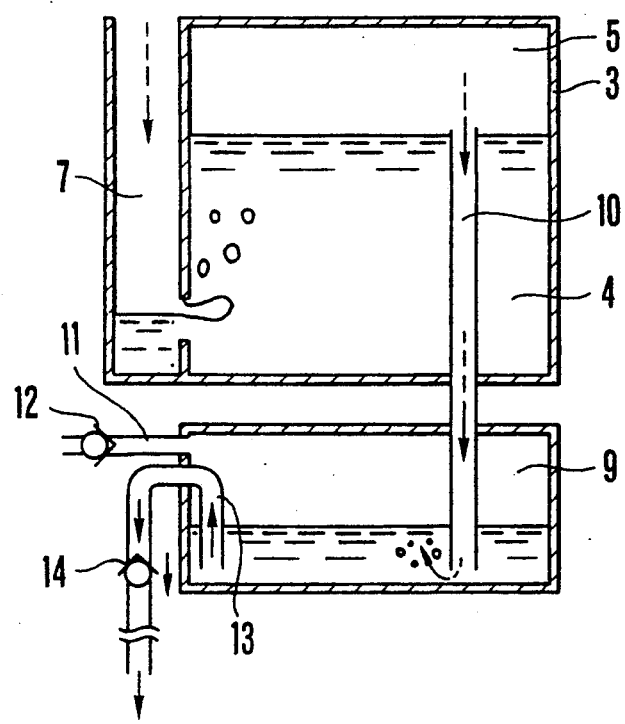

After water is discharged from the space 9 till the water level in the space 9 is lowered to the level of the open end of the siphon 13 on the side of the space 9, the initial state is restored so that water in the suppression pool 4 again flows into the space 9 through the passage 10 (as shown in FIG. 4b).

In this way, the present system operates continuously and is capable of saving the volume of the wet well 5 by an amount corresponding to the volume of the space 9 by a single operation cycle.

Figure 5:
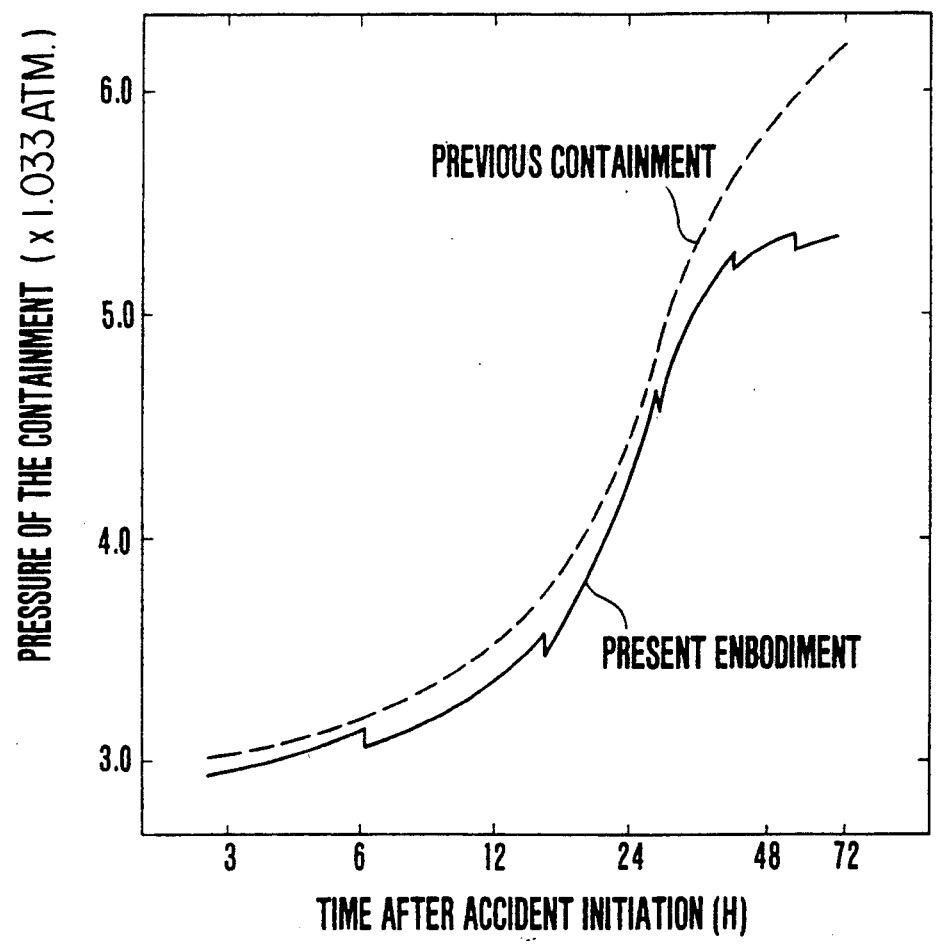
FIG. 5 is a graph showing the change in pressure in the reactor containment vessel according to the second embodiment after the occurrence of the accident in relation to time elapsed.

FIG. 5 shows the calculated value of pressure change in the reactor containment vessel of the present embodiment in relation to time, in comparison with the case of a conventional reactor containment vessel. In this case, the area of the base of the space 9 is made equal to that of the pressure suppression 3 and the height thereof is 1.0 m, so that the pressure in the reactor containment vessel 1 can be reduced by about 0.9 atm. (after the lapse of 72 hours from the occurrence of the accident) by discharging the cooling water to the dry well 6.

According to the present embodiment, in addition to the effects attained by the first embodiment, it is possible to continuously discharge the noncondensable gas and steam from the wet well to the dry well, and therefore, the effects attained by the first embodiment can be put into execution efficiently.

Next, a third embodiment of the present invention will be described with reference to FIGS. 6, 7a, 7b, 7c and 7d.

The third embodiment is a modification of the second embodiment, and therefore, detailed description thereof is omitted while denoting the same component parts as explained in the second embodiment by the same reference numerals as in the latter.

Figure 6:
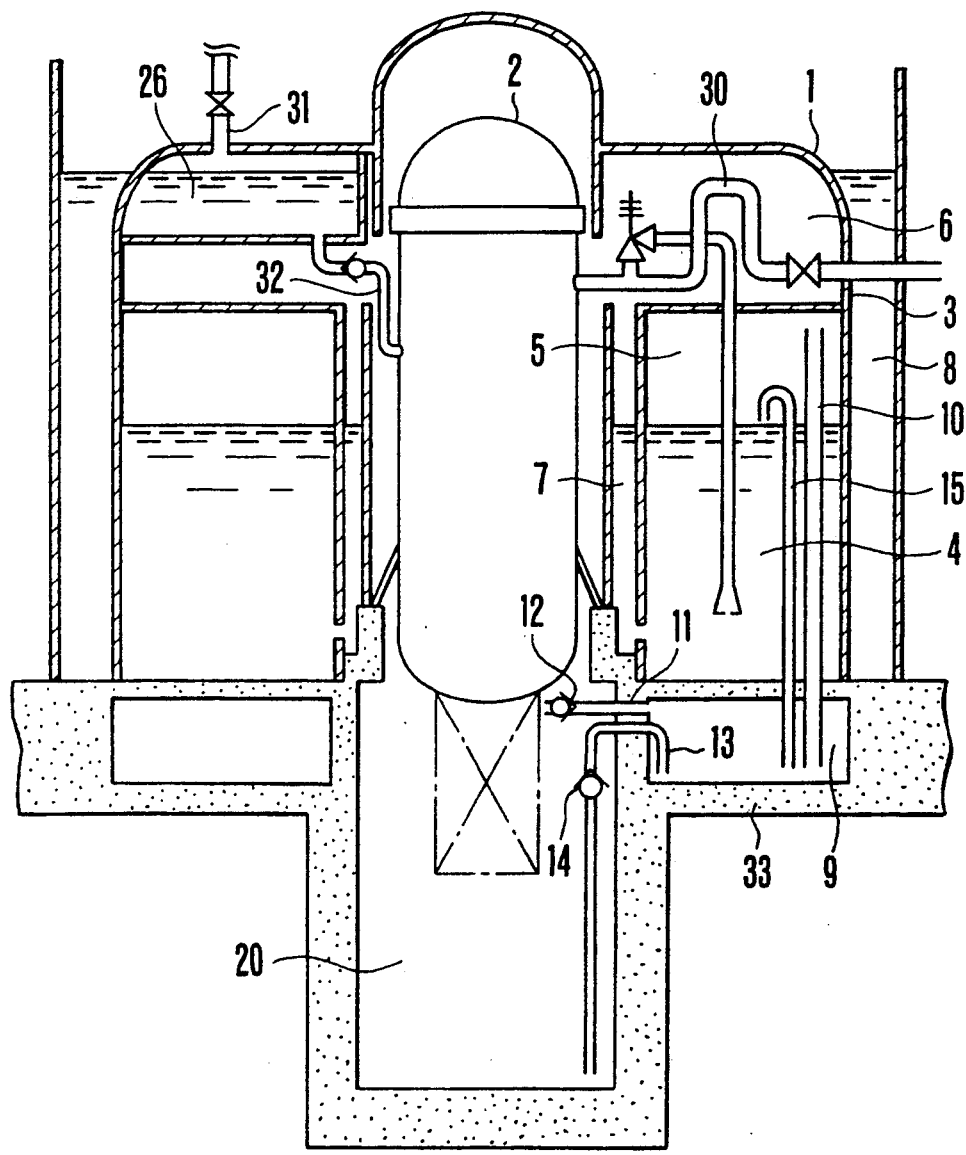
FIG. 6 is a vertical sectional view of a reactor containment vessel in accordance with a third embodiment of the present invention.

As shown in FIG. 6, in the third embodiment, a siphon 15 communicating between the wet well 5 and the space 9 is provided in addition to the arrangement of the second embodiment.

Operation of the present embodiment will be described below with reference to FIGS. 7a, 7b, 7c and 7d.

Figure 7A:
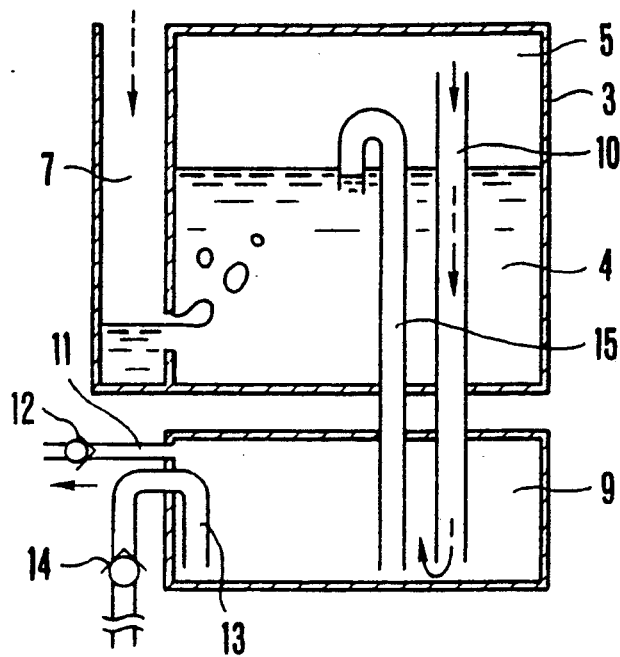
FIGS. 7a, 7b, 7c and 7d are sectional views of a portion of the reactor containment vessel according to the third embodiment, showing in sequence flows of fluid at the time of the occurrence of an accident.

Steam filled in the dry well 6 of the reactor containment vessel 1 due to an accident of fracture of the piping is caused to be flowed into the suppression pool 4 through the vent pipe 7 together with inactive noncondensable gas because the pressure in the dry well becomes high. As the pressure in the wet well 5 increases to become higher than that in the space 9 owing to the steam pressure and the noncondensable gas pressure, the noncondensable gas and steam in the wet well 5 are caused to flow into the space 9 (as shown in FIG. 7a).

Figure 7B:
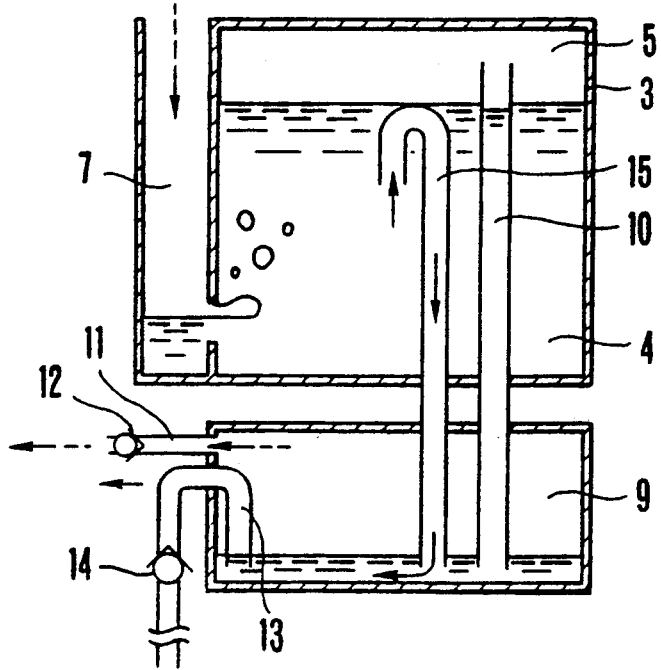

On the other hand, due to the condensation of steam in the suppression pool 4, the water level in the suppression pool 4 rises from a level corresponding to an open end (inlet) of the siphon 15 on the side of the wet well 5 to a level corresponding to the uppermost portion of the siphon 15, so that the noncondensable gas and steam in the wet well 5 are pressed by the elevated level of water so as to be caused to further flow into the space 9. As the water level in the suppression pool 4 becomes higher than the uppermost portion of the siphon 15, water is caused to flow into the space 9 through the siphon 15 so as to be pooled therein. When the water level in the space 9 becomes higher than the open end (outlet) of the passage 10 on the side of the space 9, a hydrostatic head corresponding to the difference between the water level in the suppression pool 4 and the water level in the space 9 is applied to the space 9 so that the pressure in the space 9 is increased to become higher than that in the dry well 6. In consequence, noncondensable gas and steam having flowed into the space 9 are discharged to the dry well 6 through the passage 11 communicating between the space 9 and the dry well 6 and having the check valve 12 (as shown in FIG. 7b).

Figure 7C:
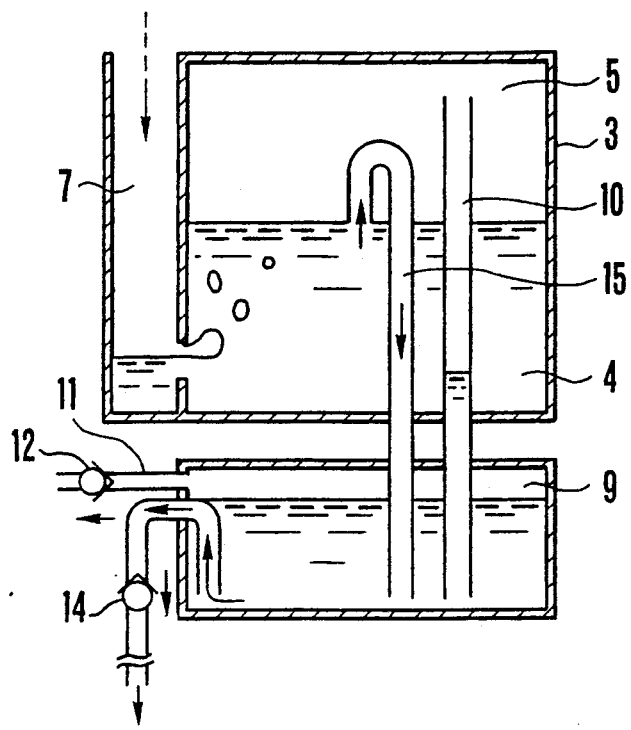

Water is allowed to continue to flow into the space 9 due to siphon effect of the siphon 15. As the water level in the space 9 becomes higher than the uppermost portion of the siphon 13, water in the space 9 is made to move downwards through the siphon 13 to open the check valve 14 so as to be discharged to the dry well 6 (as shown in FIG. 7c).

Figure 7D:
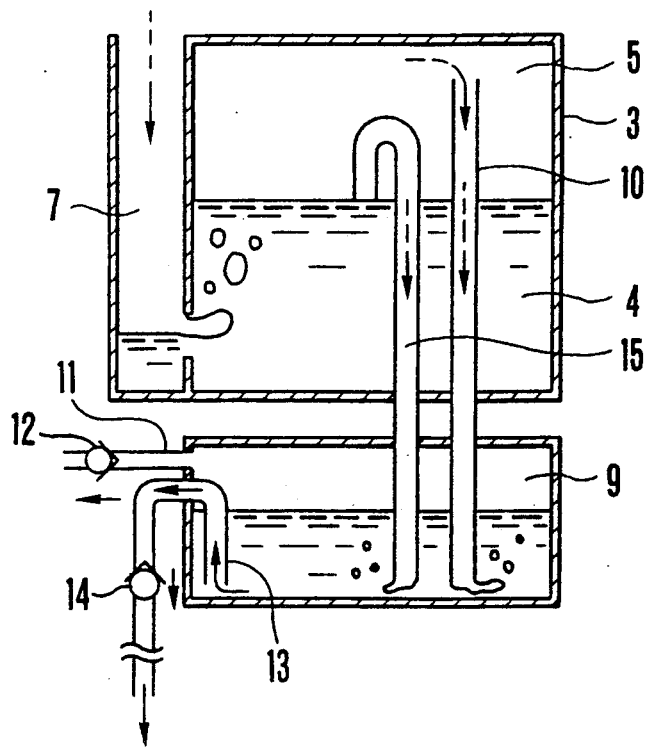

At this time, the pressure in the space 9 is reduced due to siphon effect by an amount corresponding to the difference between the water level in the space 9 and the hydrostatic head of the open end of the siphon 13 on the side of the dry well 6. Therefore, water present around the open end of the siphon 15 on the side of the wet well 5 is sucked rapidly into the space 9 so as to lower the water level in the suppression pool 4, with the result that downward movement of water from the siphon 15 to the space 9 is interrupted to allow the noncondensable gas and steam to be sucked from the wet well 5 into the space 9 (as shown in FIG. 7d).

In this case, reduction of pressure in the wet well 5 causes a further large quantity of steam in the dry well 6 to be blown thereinto through the vent pipe 7. As water in the space 9 is discharged till the water level in the space 9 is lowered to the level of the opened end (outlet) of the siphon 13 on the side of the space 9, the initial state is restored so that the water level in the suppression pool 4 starts to rise again due to condensation of steam (as shown in FIG. 7a). In this way, the present system operates continuously and is capable of saving the volume of the wet well 5 by an amount corresponding to the volume of the space 9 by a single operation cycle.

According to the present embodiment, in addition to the effects attained by the second embodiment, the volume of the wet well can be saved by continuously discharging the noncondensable gas and steam in the wet well to the dry well, and pressure rise can be suppressed effectively since a large quantity of steam in the dry well can be introduced and condensed in the suppression pool by changing the level of liquid surface of the coolant in the suppression pool.

A fourth embodiment of the present invention will be described with reference to FIGS. 8, 9a and 9b. Incidentally, the fourth embodiment is a modification of the first embodiment, and therefore, detailed description thereof is omitted while denoting the same component parts as explained in the first embodiment by the same reference numerals as in the latter.

The present embodiment is different from the arrangement of the first embodiment shown in FIG. 1 in a point that the check valve 12 is eliminated and replaced by other counter flow preventing means. The counter flow preventing means employed is as follows.

Figure 8:
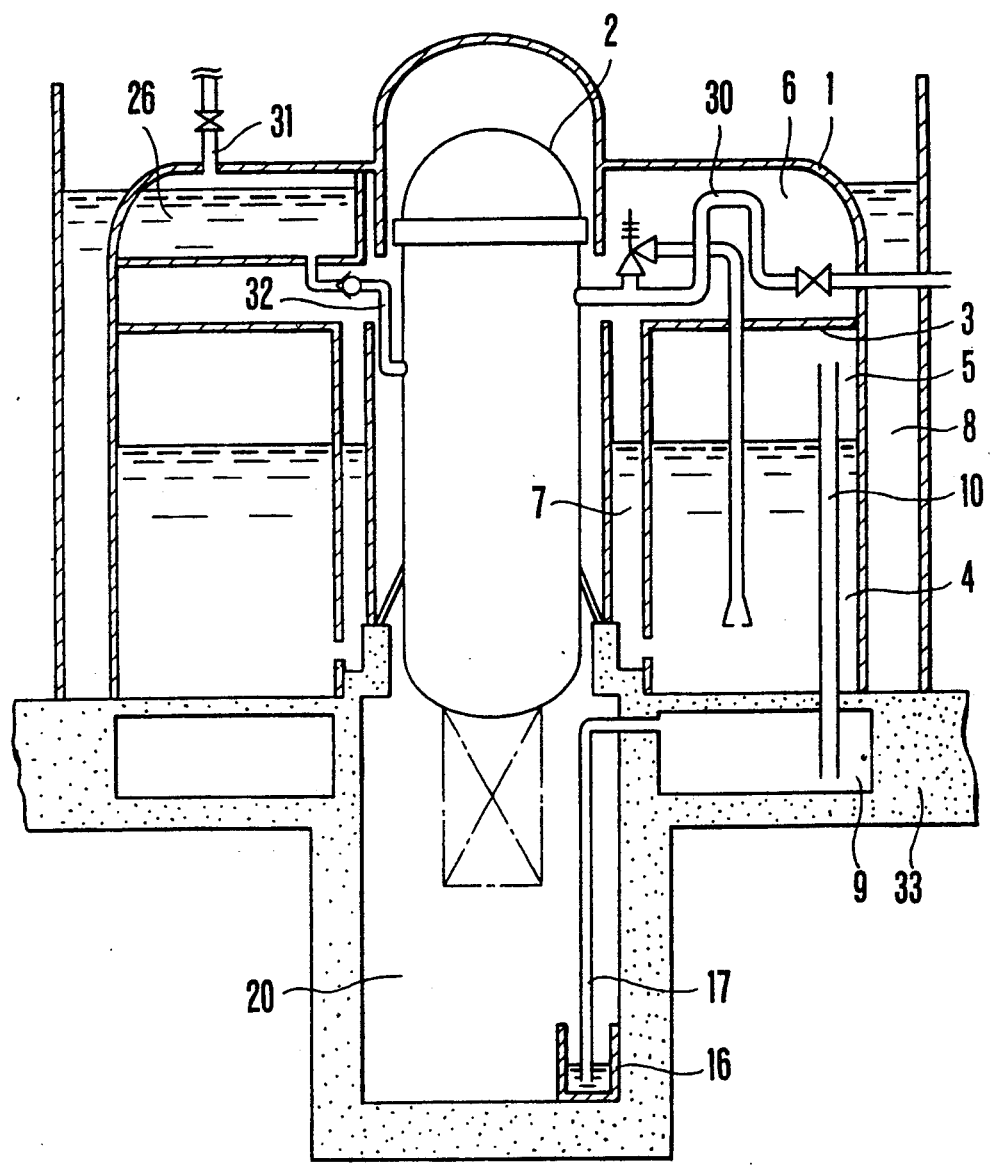
FIG. 8 is a vertical sectional view of a reactor containment vessel in accordance with a fourth embodiment of the present invention.
Figure 9A:
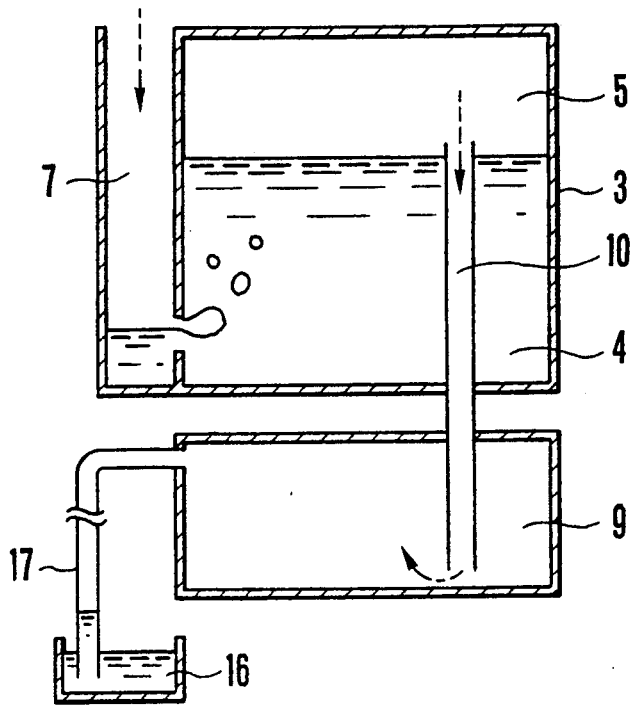
FIGS. 9a and 9b are sectional views of a portion of the reactor containment vessel according to the fourth embodiment, showing in sequence flows of fluid at the time of the occurrence of an accident.
Figure 9B:
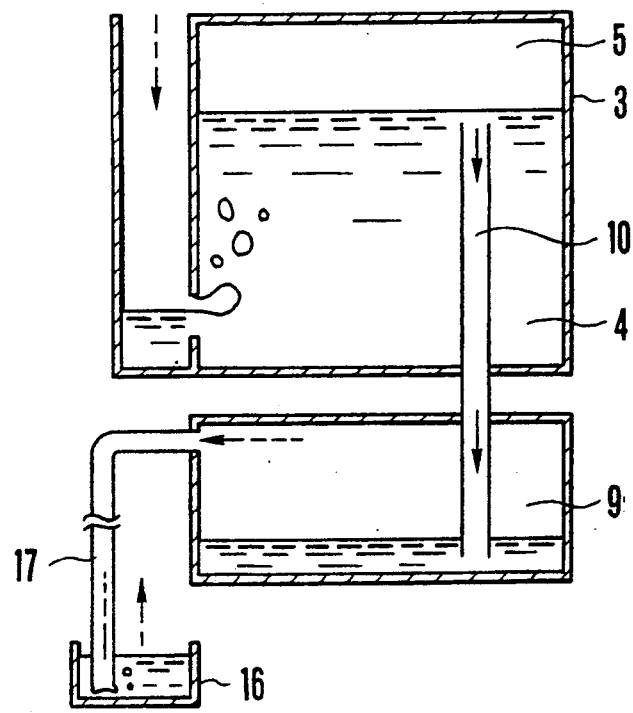

Namely, as shown in FIG. 8, a water tank 16 is installed in a lower dry well space 20 of the dry well 6. A lower end outlet of a passage 17 communicating between the space 9 and the lower dry well space 20 is submerged below the water surface in the water tank 16.

Operation of the present embodiment will be described with reference to FIGS. 9a and 9b.

Steam filled in the dry well 6 of the reactor containment vessel 1 due to an accident of fracture of the piping is caused to be flowed into the suppression pool 4 through the vent pipe 7 together with inactive noncondensable gas because the pressure in the dry well 6 becomes high. As the pressure in the wet well 5 increases to become higher than that in the space 9 owing to the steam pressure and the noncondensable gas pressure, the noncondensable gas and steam in the wet well 5 are caused to flow into the space 9 through the passage 10 (as shown in FIG. 9a).

Steam is condensed in the water in the suppression pool 4 so that the quantity of water in the suppression pool 4 is increased and, accordingly, the water level in the suppression pool 4 rises. As the level of the coolant water in the suppression pool 4 becomes higher than the open end of the passage 10 on the side of the wet well 5, the coolant flows through the passage 10 into the space 9 so as to be pooled therein. As the water level in the space 9 becomes higher than the open end of the passage 10 on the side of the space 9, a hydrostatic head corresponding to the difference between the water level in the suppression pool 4 and the water level in the space 9 is applied to the space 9 so that the pressure in the space 9 is increased to become higher than that in the dry well 6. In consequence, noncondensable gas and steam flowed into the space 9 are passed through the passage 17 communicating between the space 9 and water in the water tank 16 and then released from water in the water tank 16 to the dry well 6 (as shown in FIG. 9b).

In proportion as the quantity of coolant water in the suppression pool 4 increases, water flows into the space 9. After the space 9 is filled up with water, the increment of water in the suppression pool 4 is discharged to the dry well 6 through the passage 17 and the water tank 16 due to a hydrostatic head corresponding to the difference between the water level in the suppression pool 4 and the water level in the water tank 16. In this way, the water level in the suppression pool 4 is maintained constant to thereby prevent reduction of the volume of the wet well 5.

According to the present embodiment, in addition to the effects attained by the first embodiment, it is possible to discharge the noncondensable gas and steam accumulated in the wet well to the dry well without using any dynamically operated machine including mechanical valve such as the check valve 12.

A fifth embodiment of the present invention will be described with reference to FIGS. 10, 11a, 11b, 11c and 11d.

The present embodiment is a modification of the fourth embodiment, and therefore, detailed description thereof is omitted while denoting the same component parts as those of the fourth embodiment by the same reference numerals.

Figure 10:
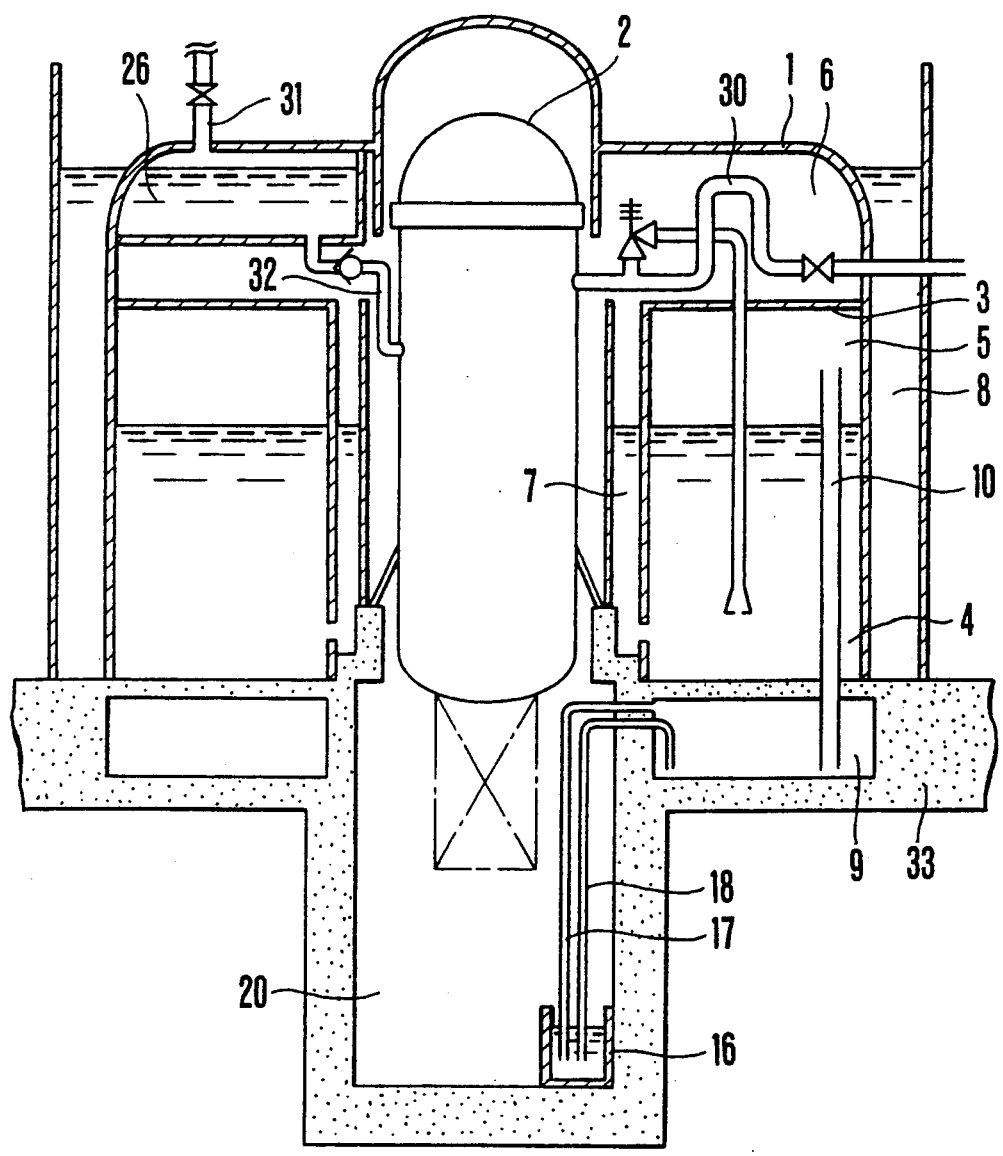
FIG. 10 is a vertical sectional view of a reactor containment vessel in accordance with a fifth embodiment of the present invention.

In the fifth embodiment, the following structure is added to the fourth embodiment shown in FIG. 8, as shown in FIG. 10.

Namely, as shown in FIG. 10, a siphon 18 communicating between the space 9 and water in the water tank 16 is further added. In this case, difference between the height of a portion of the siphon 18 at the bottom of the space 9 and a height of the water surface in the water tank 16 is designed to be higher than the blowing hydrostatic head of the vent pipe 7, and the passage area of the siphon 18 larger than that of the passage 10.

Operation of the present embodiment will be described below with reference to FIGS. 11a, 11b, 11c and 11d.

Figure 11A:
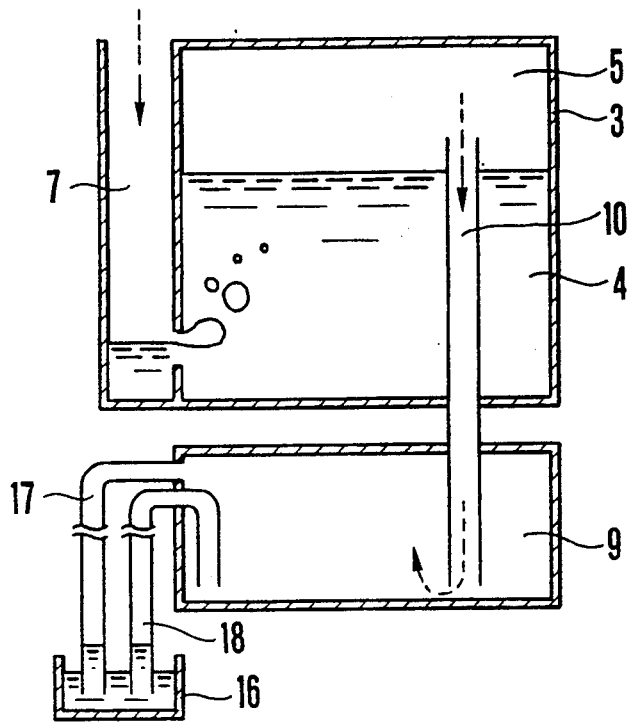
FIGS. 11a, 11b, 11c and 11d are sectional views of a portion of the reactor containment vessel according to the fifth embodiment, showing in sequence flows of fluid at the time of the occurrence of an accident.

Steam filled in the dry well 6 of the reactor container vessel 1 due to an accident of fracture of the piping is caused to be flowed into the suppression pool through the vent pipe 7 together with inactive non-condensable gas because the pressure in the dry well 6 become high. As the pressure in the wet well 5 increase to become higher than that in the space 9 owing to the steam pressure and the noncondensable gas pressure, the noncondensable gas and steam in the wet well 5 are caused to flow into the space 9 through the passage 10 (as shown in FIG. 11a).

Since steam is condensed in the coolant water in the suppression pool 4, the quantity of water in the suppression pool 4 is increased so that the water level in the suppression pool 4 rises. As the water level in the suppression pool 4 becomes higher than the open end of the passage 10 on the side of the wet well 5, water flows into the space 9 through the passage 10 so as to be pooled therein. As the water level in the space 9 becomes higher than the open end of the passage 10 on the side of the space 9, a hydrostatic head corresponding to the difference between the water level in the suppression pool 4 and the water level in the space 9 is applied to he space 9 so that the pressure in the space 9 is increased to become higher than that in the dry well 6. In consequence, noncondensable gas and steam flowed into the space 9 are made to be released through the passage 17 communicating between the space 9 and water in the water tank 16 and then through water in the water tank 16 to the dry well 6 (as shown in FIG. 11b).

In proportion as the quantity of the coolant in the suppression pool 4 increases, the coolant thus increased flows into the space 9 through the passage 10. When the water level in the space 9 rises to a level higher than the uppermost portion of the siphon 18, water in the space 9 moves downwards through the siphon 18 so as to be discharged to the water tank 16 and to the dry well (as shown in FIG. 11c).

At this time, the pressure in the space 9 is reduced due to siphon effect by an amount corresponding to the difference in the hydrostatic head between the water level in the space 9 and the water level in the water tank 16. As a result, water present around the open end of the passage 10 on the side of the wet well 5 is rapidly sucked into the space 9 and, accordingly, the water level in the suppression pool 4 is lowered. Then, noncondensable gas and steam are allowed to flow by suction from the wet well 5 into the space 9 (as shown in FIG. 11d).

Figure 11B:
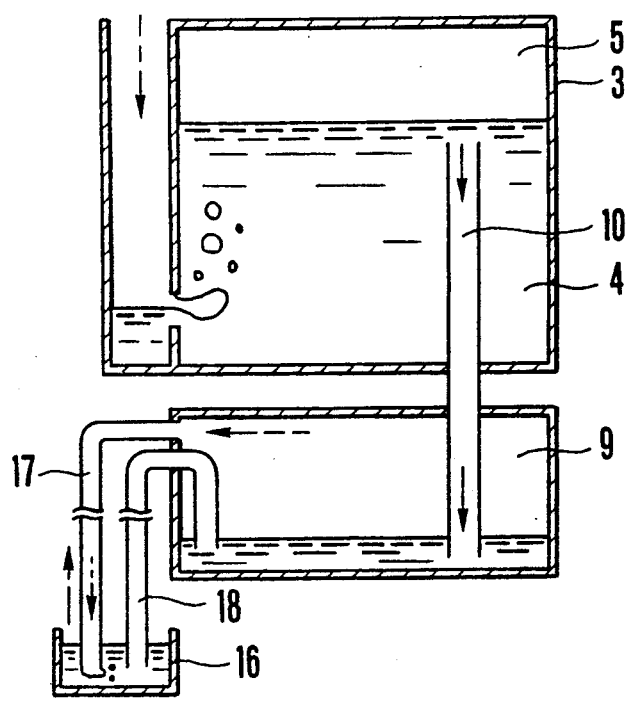
Figure 11C:
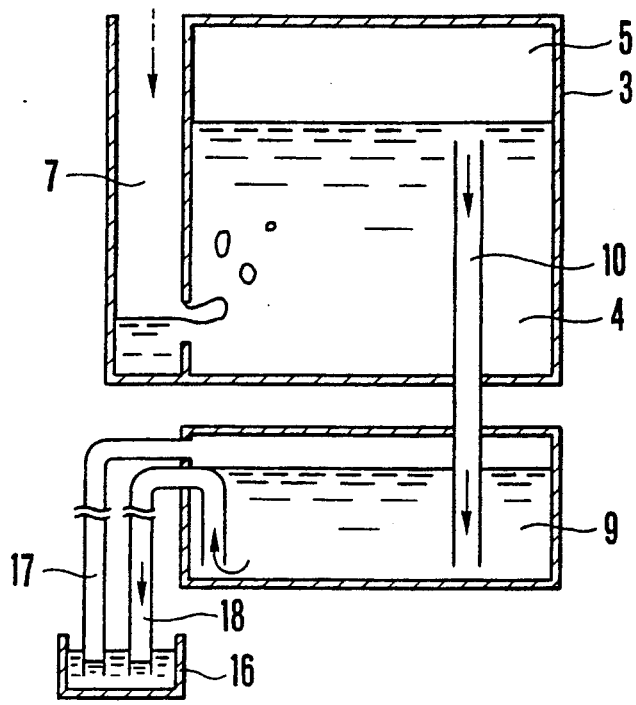
Figure 11D:
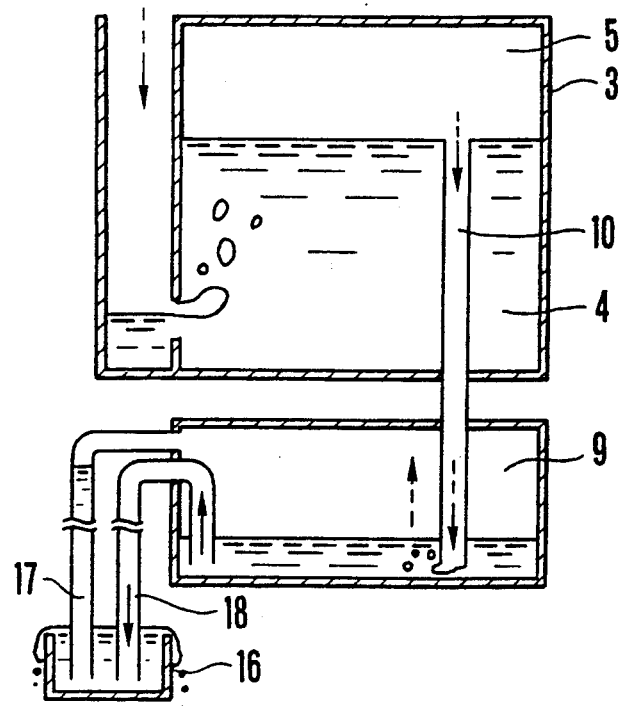

After water is discharged from the space 9 till the water level in the space 9 is lowered to the level of the siphon 18 on the side of the space 9, the initial state is restored so that water in the suppression pool 4 again flows into the space 9 through the passage 10 (as shown in FIG. 11b). In this way, the present system operates continuously and is capable of saving the volume of the wet well 5 by an amount corresponding to the volume of the space 9 by a single operation cycle.

According to the present embodiment, in addition to the effects attained by the fourth embodiment, the volume of the wet well can be saved and pressure rise in the reactor containment vessel can be suppressed more effectively by continuously discharging the noncondensable gas and steam in the wet well to the dry well.

A sixth embodiment of the present invention will be described with reference to FIGS. 12, 13a, 13b, 13c and 13d.

The sixth embodiment is a modification of the fifth embodiment shown in FIG. 10, and therefore, detailed description thereof is omitted while denoting the same component parts as those of the fifth embodiment by the same reference numerals.

In the sixth embodiment, the following structure is added to the fifth embodiment.

Figure 12:
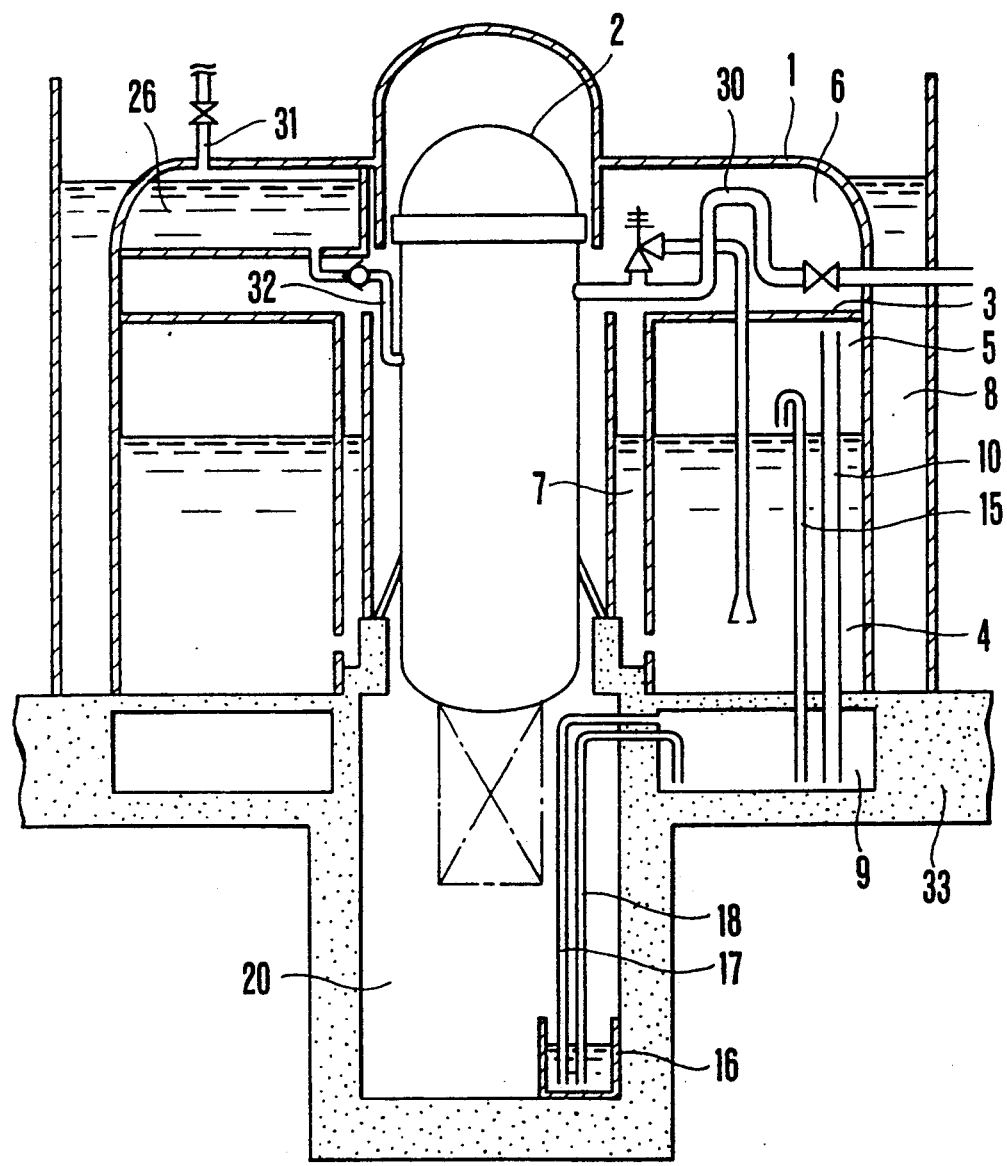
FIG. 12 is a vertical sectional view of a reactor containment vessel in accordance with a sixth embodiment of the present invention.

Namely, as shown in FIG. 12, a siphon 15 communicating between the wet well 5 and the space 9 is provided additionally. Operation of the present embodiment will be described below with reference to FIGS. 13a, 13b, 13c and 13d.

Figure 13A:
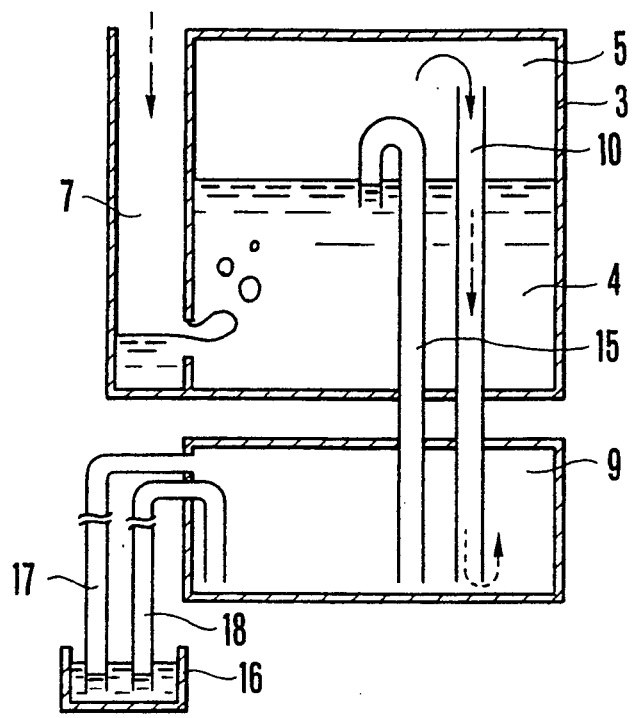
FIGS. 13a, 13b, 13c and 13d are sectional views of a portion of the reactor containment vessel according to the sixth embodiment, showing in sequence flows of fluid at the time of the occurrence of an accident.

Steam filled in the dry well 6 of the reactor containment vessel 1 due to an accident of fracture of the piping is caused to be flowed into the suppression pool 4 through the vent pipe 7 together with inactive noncondensable gas because the pressure in the dry well 6 becomes higher at the time of the occurrence of accident. As the pressure in the wet well 5 increases to become higher than that in the space 9 owing to the steam pressure and the noncondensable gas pressure, the noncondensable gas and steam in the wet well 5 are caused to flow through the passage 10 into the space 9 (as shown in FIG. 13a).

Figure 13B:
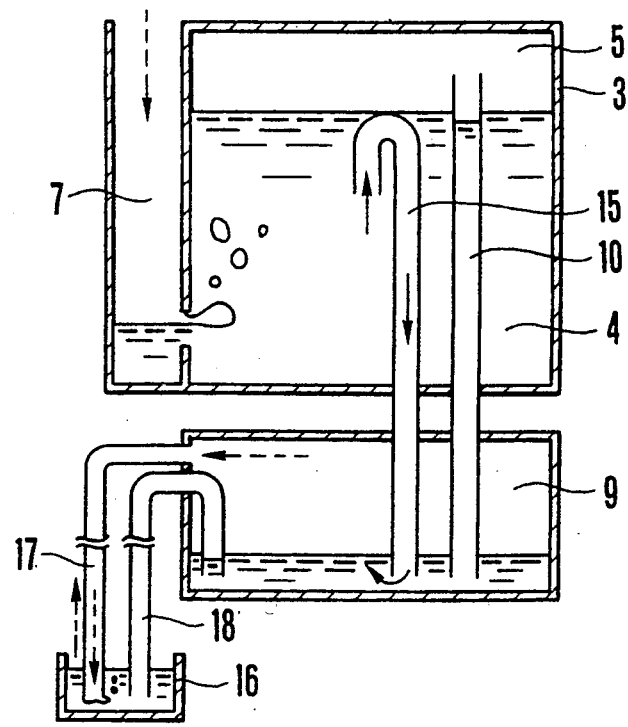

On the other hand, due to the condensation of steam, the water level in the suppression pool 4 rises from a level corresponding to an open end of the siphon 15 on the side of the wet well 5 to a level corresponding to the uppermost potion of the siphon 15, so that the noncondensable gas and steam in the wet well 5 are pressed by the action of the rising water surface so as to be caused to further flow into the space 9. As the level of coolant in the suppression pool 4 becomes higher than the uppermost portion of the siphon 15, the coolant is caused to flow into the space 9 through the siphon 15 so as to be pooled therein. When the water level in the space 9 becomes higher than the open end of the passage 10 on the side of the space 9, a hydrostatic head corresponding to the difference between the water level in the suppression pool 4 and the water level in the space 9 is applied to the space 9 so that the pressure in the space 9 is increased to become higher than that in the dry well 6. In consequence, noncondensable gas and steam flowed into the space 9 are released through the passage 17 communicating between the space 9 and water in the water tank 16 and then from water in the water tank 16 to the dry well 6 (as shown in FIG. 13b).

Figure 13C:
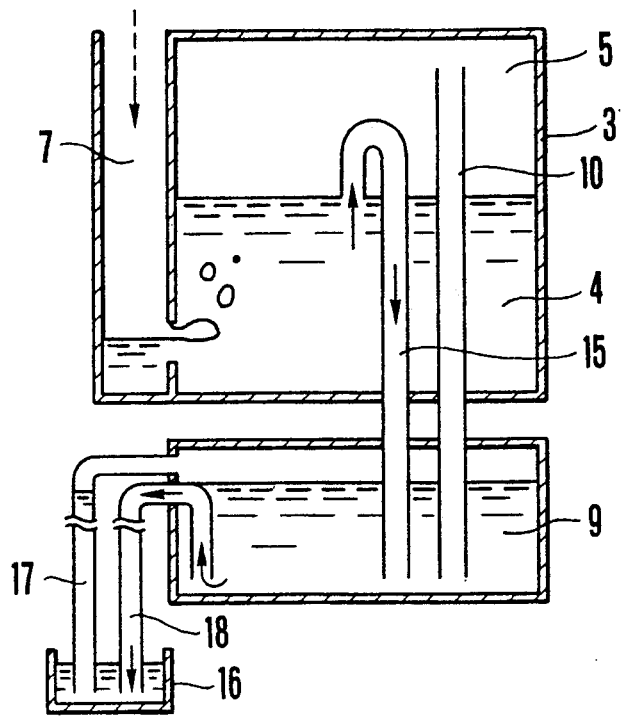

Water is allowed to continue to flow into the space 9 from the suppression pool 4 due to siphon effect of the siphon 15. As the water level in the space 9 becomes higher than the uppermost portion of the siphon 18, coolant in the space 9 is made to move downwards through the siphon 18 so as to be discharged from the water tank 16 to the dry well 6 (as shown in FIG. 13c).

Figure 13D:
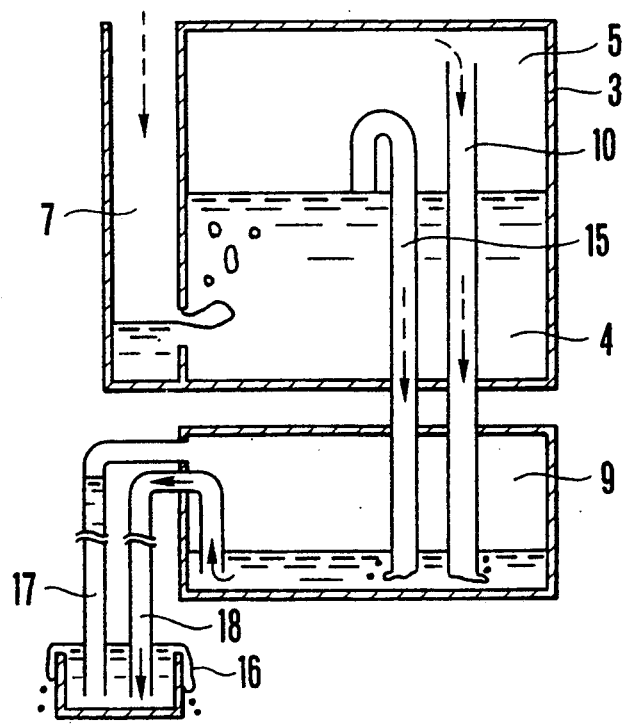

At this time, the pressure in the space 9 is reduced due to siphon effect by an amount corresponding to the difference in hydrostatic head between the water level in the space 9 and the water level in the water tank 16. Therefore, water present around the open end of the siphon 15 on the side of the wet well 5 is sucked rapidly into the space 9 so as to lower the water level in the suppression pool 4, with the result that downward movement of coolant from the siphon 15 to the space 9 is interrupted to allow the noncondensable gas and steam to be sucked from the wet well 5 into the space 9 (as shown in FIG. 13d).

In this case, reduction of pressure in the wet well 5 causes a further large quantity of steam in the dry well 6 to be blown into the suppression pool 4 through the vent pipe 7. As water in the space 9 is discharged till the water level in the space 9 is lowered to the level of the open end of the siphon 18 on the side of the space 9, the initial state is restored so that the water level in the suppression pool 4 starts to rise again due to condensation of steam (as shown in FIG. 13a). In this way, the present system operates continuously and is capable of saving the volume of the wet well 5 by an amount corresponding to the volume of the space 9 by a single operation cycle.

According to the present embodiment, in addition to the effects attained by the fifth embodiment, pressure rise in the reactor containment vessel can be suppressed more effectively since a large quantity of steam in the dry well can be introduced and condensed in the suppression pool by changing the level of liquid surface in the wet well.

A seventh embodiment of the present invention will be described with reference to FIG. 14.

The present embodiment is a modification of the third embodiment, and therefore, detailed description thereof is omitted while denoting the same component parts as the third embodiment by the same reference numerals.

Figure 14:
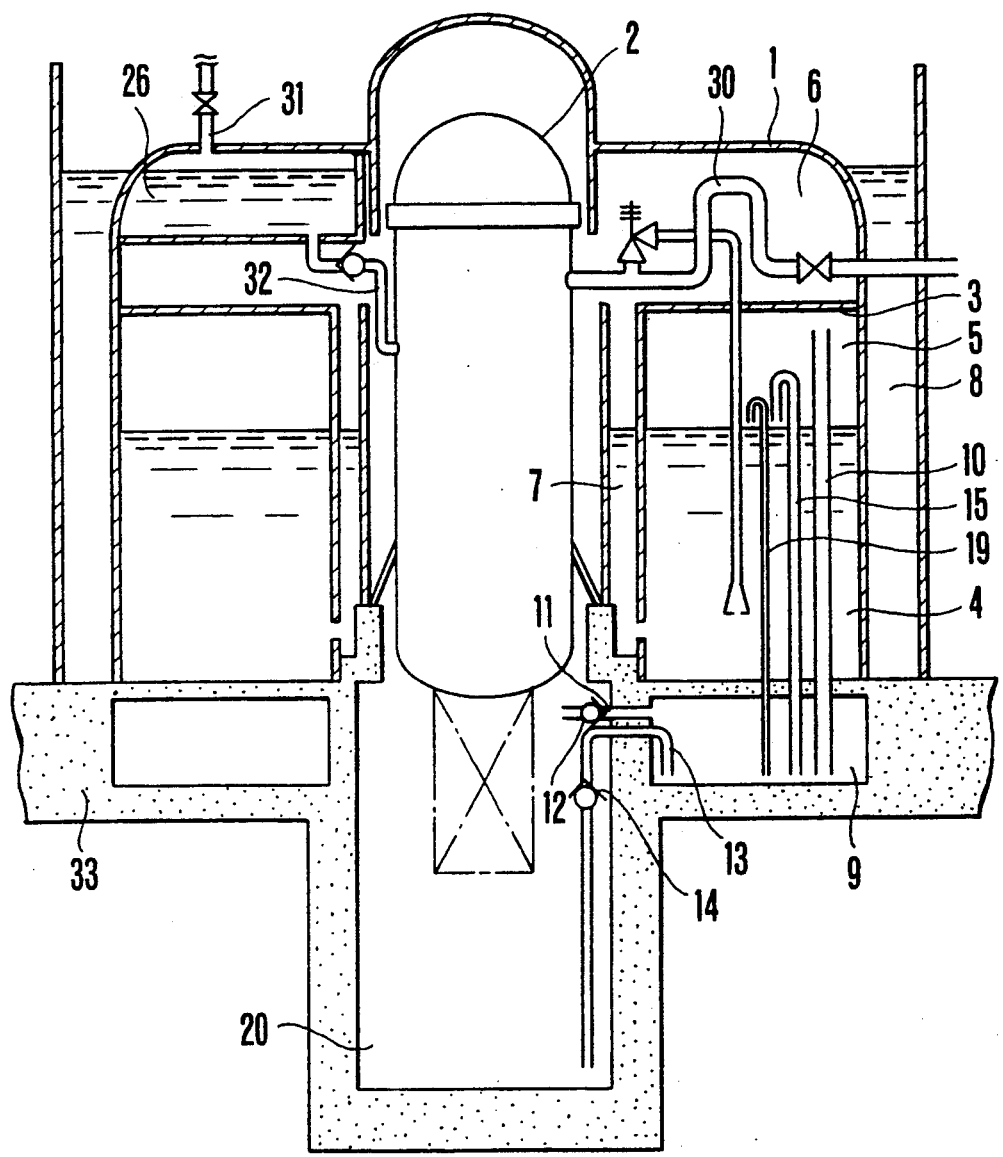
FIG. 14 is a vertical sectional view of a reactor containment vessel in accordance with a seventh embodiment of the present invention.

In the seventh embodiment, as shown in FIG. 14, the following structure is added to the third embodiment shown in FIG. 6.

Since decay heat is decreased with time elapsed after the occurrence of an accident of fracture of the piping, the rate at which the water level in the suppression pool 4 rises is decreased in proportion to the decay heat. Therefore, if the diameter of the siphon 15 is too large compared with the rate of increase of the quantity of coolant in the suppression pool 4, there is a possibility that no siphon effect can be achieved where a space remains in the siphon 15 at its uppermost portion thereof since water moves downwards to the space 9. To cope with this, in addition to the siphon 15 employed in the third embodiment shown in FIG. 6, another siphon 19 having a smaller diameter than the siphon 15 is provided so as to communicate between the wet well 5 and the space 9. By this arrangement, in case that the water level in the suppression pool 4 rises rapidly, the siphon 19 having the smaller diameter operates first and, after the water level in the suppression pool 4 further rises continuously, the siphon 15 then operates, while in case that the water level in the suppression pool 4 rises slowly, the siphon 19 alone operates, so as to make water move downwards from the suppression pool 4 to the space 9. It is also possible to add the same structure to the sixth embodiment shown in FIG. 12.

According to the present embodiment, in addition to the effects achieved by the third or sixth embodiment, it is possible to discharge efficiently noncondensable gas and steam to the dry well irrespective of the rising rate of the water level of coolant in the suppression pool.

Figure 15:
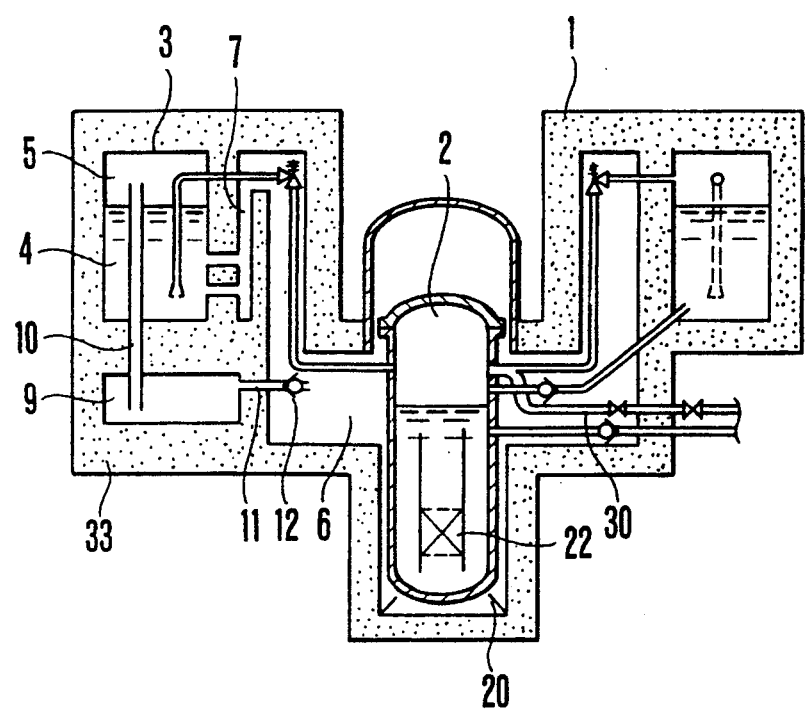
FIG. 15 is a vertical sectional view of a reactor containment vessel in accordance with an eighth embodiment of the present invention.

An eighth embodiment of the present invention will be described with reference to FIG. 15. The present embodiment is applicable to the embodiments shown in FIGS. 1, 3, 6, 8, 10, 12 and 14, and the point of modification in the respective embodiments is as follows. Namely, it is designed that the water surface in the suppression pool 4 is present above the reactor pressure vessel 2 and that the space 9 is formed below the water surface in the suppression pool 4 and above a core 22.

By this arrangement, it is possible to pour the cooling water discharged from the space 9 or the water tank 16 at the time of an accident of fracture of the piping into the lower dry well space (cavity) 20 defined below the reactor pressure vessel 2 and onto the outer periphery of the pressure vessel 2 while allowing a small quantity of coolant to come in contact with them.

According to the present embodiment, in addition to the effects inherent in the other embodiments the arrangements of which are modified additionally according to the present embodiment, an excellent cooling effect is achieved since the reactor pressure vessel can be cooled from outside with the coolant from the suppression pool at the time of accident, and, since cooling water is poured into the dry well the pressure in which is higher than that in the pressure suppression so as to be made to readily come in contact with the reactor pressure vessel, the reactor pressure vessel which is the source of the temperature rise in the dry well can be cooled effectively to suppress the temperature rise in the dry well and hence reduce the pressure depending upon the temperature, thereby suppressing the pressure rise in the reactor containment vessel.

A ninth embodiment of the present invention will be described with reference to FIG. 16.

The present embodiment is a modification of the second embodiment, and therefore, detailed description thereof is omitted while denoting the same component parts as those in the second embodiment by the same reference numerals.

Figure 3:
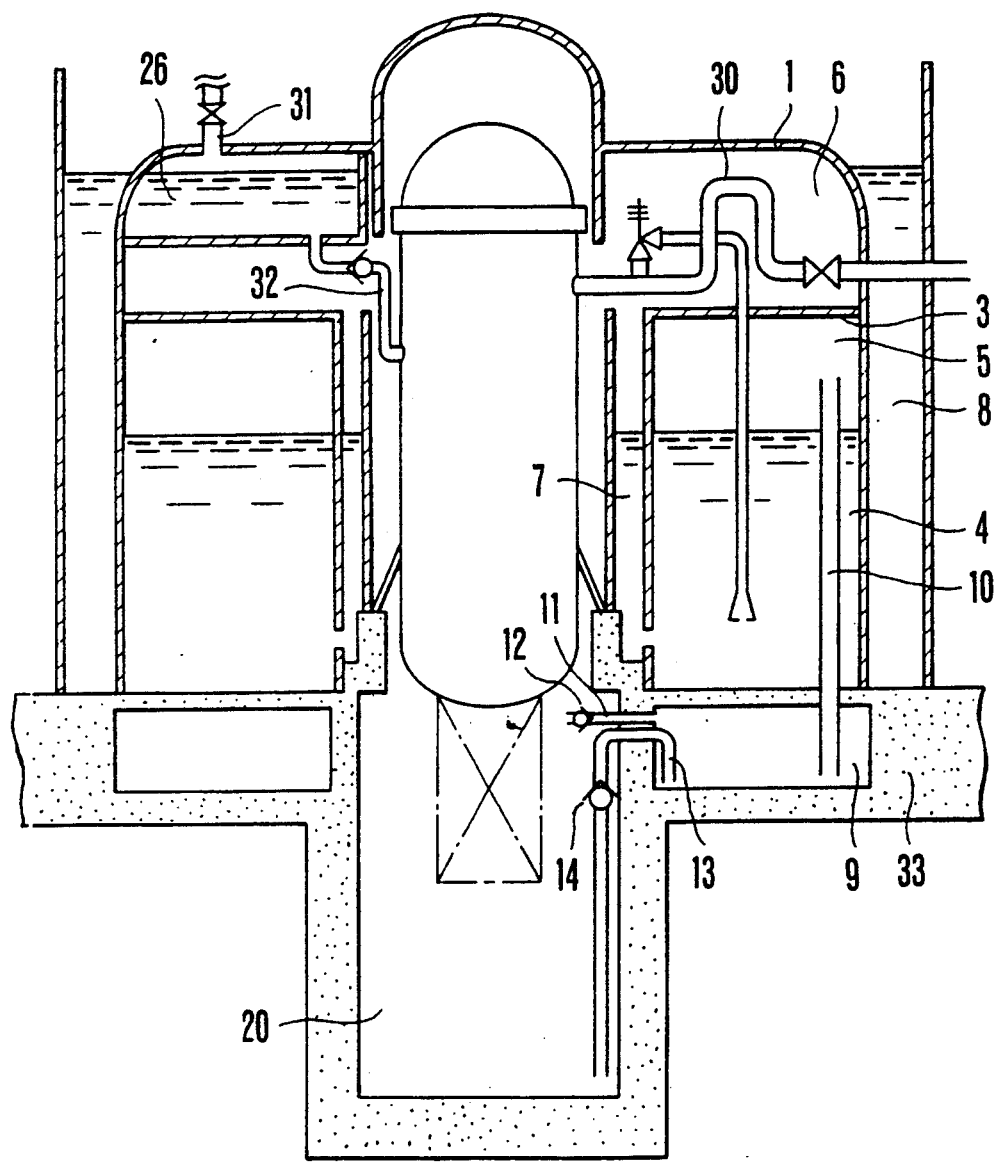
FIG. 3 is a vertical sectional view of a reactor containment vessel in accordance with a second embodiment of the present invention.
Figure 16:
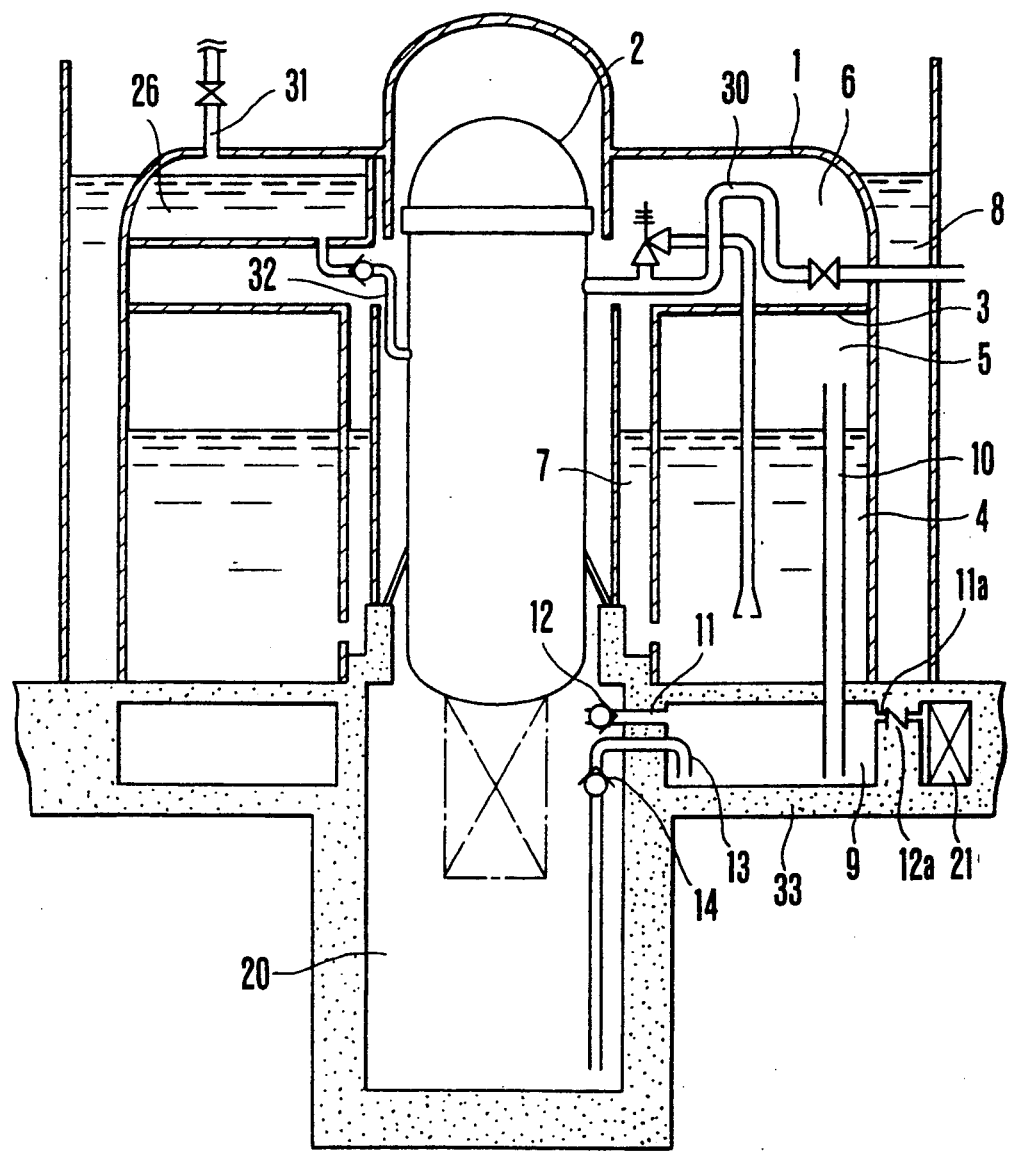
FIG. 16 is a vertical sectional view of a reactor containment vessel in accordance with a ninth embodiment of the present invention.

In the ninth embodiment, as shown in FIG. 16, the following structure is added to the second embodiment shown in FIG. 3.

Namely, in addition to the arrangement of the embodiment shown in FIG. 3, a space 21 accommodating activated charcoal which is capable of adsorbing non-condensable gas is formed in the foundation of the reactor containment vessel 1. The space 21 is opened and closed with respect to the space 9 by means of a passage 11a having a mechanism operative in response to the temperature at the time of an accident or a structure 12a which induces break of sealing such as melting in response to the temperature at the time of the accident. The quantity of activated charcoal to be accommodated in the space 21 is as much as capable of thoroughly adsorbing the noncondensable gas existing in the reactor container vessel 1.

Since noncondensable gas and steam flowed into the space 9 from the wet well 5 are released to below the water surface in the space 9, steam is condensed so as to increase the concentration of noncondensable gas in the gas phase part of the space 9. The noncondensable gas thus concentrated is discharged to the space 21 accommodating activated charcoal, thereby making it possible to selectively remove the noncondensable gas in the dry well 6. It is also possible to selectively remove the noncondensable gas likewise in a case where the present embodiment is applied to the third embodiment.

According to the present embodiment, in addition to the effects inherent in the respective embodiments, it is possible to remove noncondensable gas accumulated in the wet well by taking it in a solid without returning into the dry well, and therefore, a more excellent effect of suppressing the pressure rise in the container vessel can be achieved.

Figure 17:
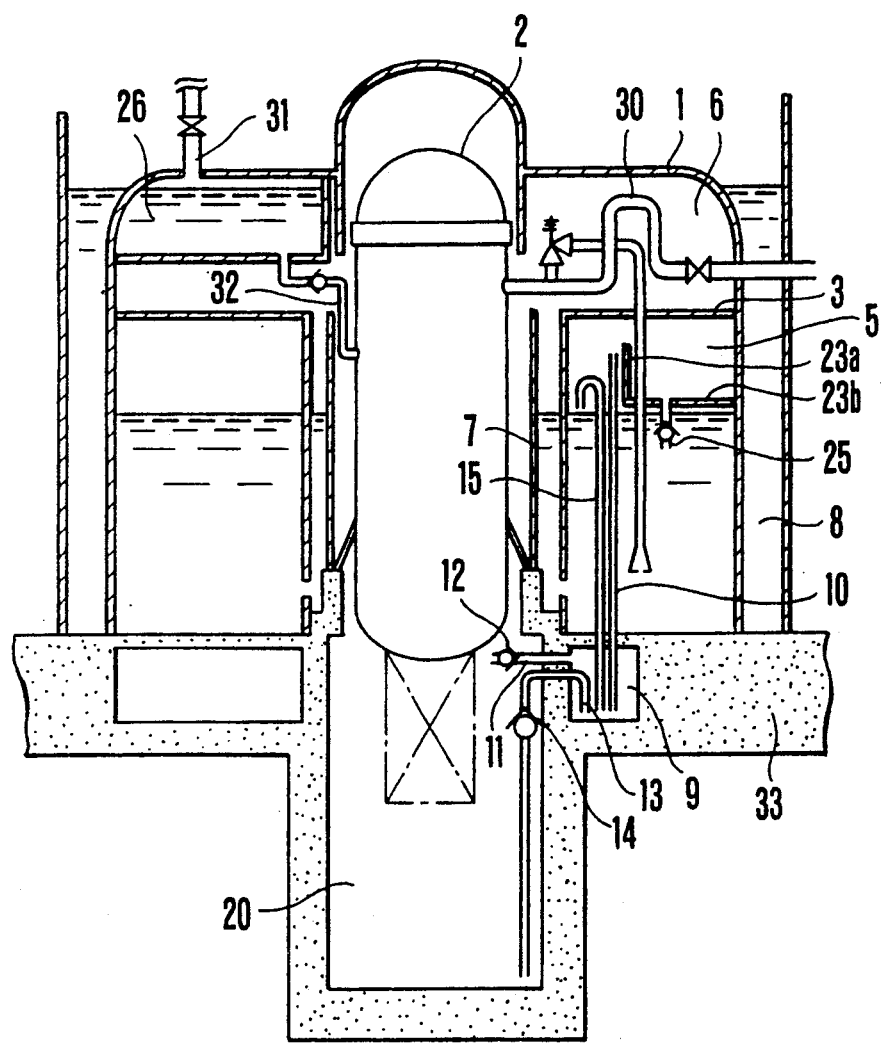
FIG. 17 is a vertical sectional view of a reactor containment vessel in accordance with a tenth embodiment of the present invention.

A tenth embodiment of the present invention will be described with reference to FIG. 17.

The present embodiment is applicable to the embodiments shown in FIGS. 1, 3, 6, 8, 10, 12, 15 and 16. In this embodiment, description will be made about a case in which the third embodiment shown in FIG. 6 is modified.

The structure added to the arrangement of the third embodiment is as follows,

Namely, a baffle 23b is provided in contact with an outer side wall (or an inner side wall) of the pressure suppression to extend substantially horizontally in the vicinity of the water surface in the suppression pool 4, and another baffle 23a is provided in contact with the baffle 23b to extend substantially vertically to a height below the upper wall of the pressure suppression 3, thereby forming an empty chamber. The baffle 23b is provided with a passage 25 which communicates two sections above and below the baffle 23b with each other and has a check valve.

Steam filled in the dry well 6 of the reactor containment vessel 1 due to an accident of fracture of the piping is caused to be flowed into the suppression pool 4 through the vent pipe 7 together with inactive noncondensable gas because the pressure in the dry well 6 becomes high. As the pressure in the wet well 5 increases to become higher than that in the space 9 owing to the steam pressure and the noncondensable gas pressure, the noncondensable gas and steam in the wet well 5 are caused to flow into the space 9 through the passage 10. When the water level in the suppression pool 4 rises to reach the baffle 23b due to condensation of steam, water in the suppression pool 4 moves upwards in a space surrounded by the baffle 23a. Since the area of the space surrounded by the baffle 23a is smaller than the area of the pressure suppression 3, the water level of coolant in the suppression pool 4 rises rapidly. For this reason, the quantity of coolant flowing into the space 9 through the siphon 15 is reduced and the period of flowing-in becomes shorter. In consequence, even when the rate of rise of the coolant water level in the suppression pool 4 is low, not only the coolant is allowed to flow into the space 9 without fail but also the volume of the space 9 can be saved. Further, the cooling water staying on the upper surface of the baffle 23b due to ruffling and rapid rise of the water surface of the suppression pool 4 can be returned to be poured into the suppression pool 4 by means of the passage 25 having the check valve. In addition, since the water surface of the suppression pool 4 can be pressed by the baffle 23b in normal operating condition, the ruffling or change of the water surface can be suppressed.

According to the present embodiment, in addition to the effects inherent in the respective embodiments, it is possible to discharge noncondensable gas and steam to the dry well even when the rate of rise of the water level in the suppression pool at the time of an accident of fracture of the piping is low, and to achieve an effect of suppressing the change of the water surface of the suppression pool in normal operating condition and an effect of saving the volume of the space 9.

Figure 18:
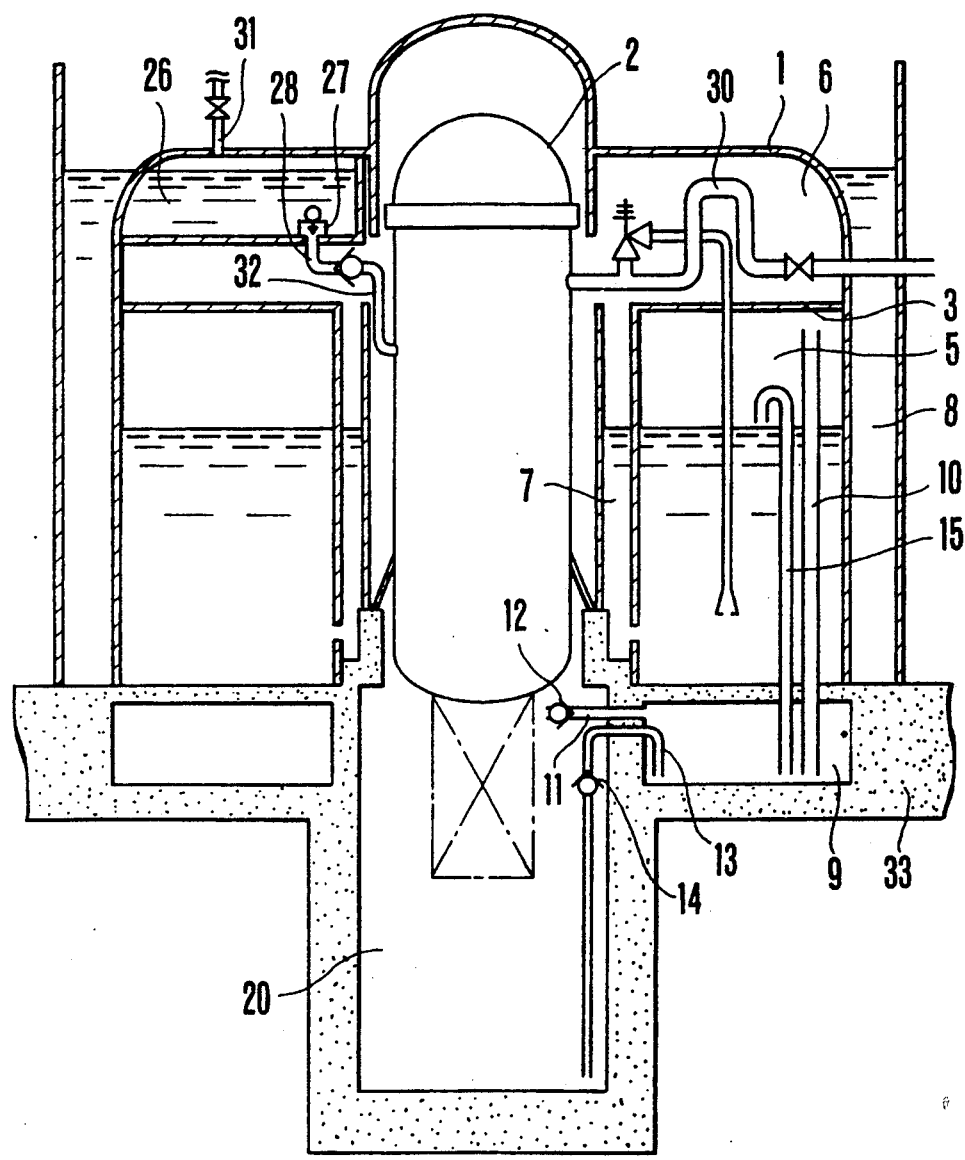
FIG. 18 is a vertical sectional view of a reactor containment vessel in accordance with an eleventh embodiment of the present invention.
Figure 19A:
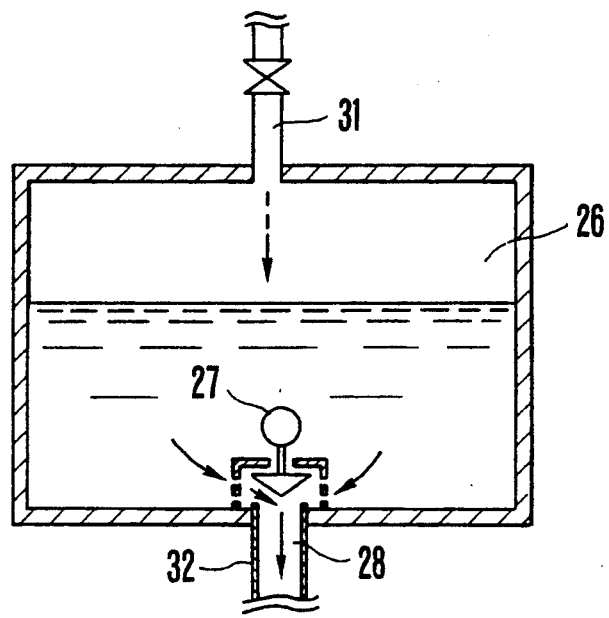
FIGS. 19a and 19b are sectional views of a portion of the reactor containment vessel according to the eleventh embodiment, showing the operating condition thereof in sequence.
Figure 19B:
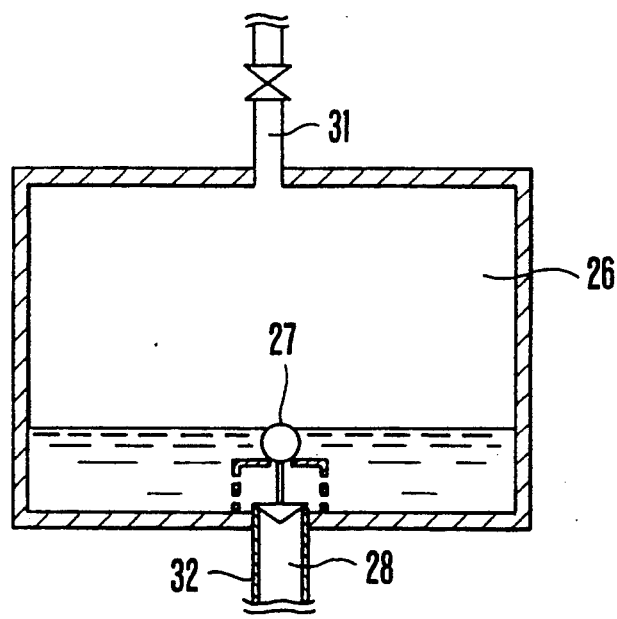

An eleventh embodiment of the present invention will be described with reference to FIGS. 18, 19a and 19b.

The present embodiment is applicable to the embodiments shown in FIGS. 1, 3, 6, 8, 10, 12, 16 and 17. Description will be made here about a representative case in which the present embodiment is applied to the third embodiment shown in FIG. 6.

The structure to be added to the third embodiment is as follows.

Namely, there is provided in the high pressure water tank 26 a float valve 27 serving to close a water inlet 28 in accordance with the fall of water level in the tank.

Operation of the present embodiment will be described with reference to FIGS. 19a and 19b.

In order to pour cooling water into the pressure vessel 2 at the time of an accident of fracture of the piping, noncondensable gas is supplied to the high pressure water tank 26. In the conventional containment vessel 1, after the pouring of cooling water, the noncondensable gas flowed through the water inlet 28 into the pressure vessel 2 and was then released from the fracture into the containment vessel 1. However, by the provision of the float valve 27 in the high pressure water tank 26 as shown in FIG. 19a, as the water level in the high pressure water tank 26 falls, the water inlet 28 is closed by the float valve 27 as shown in FIG. 19b. In consequence, the noncondensable gas supplied under pressure into the high pressure water tank 26 through the pipeline 31 for the purpose of forcibly feeding the cooling water in the high pressure water tank 26 into the reactor pressure vessel 2 is prevented from flowing into the reactor containment vessel 1 through the fracture.

According to the present embodiment, in addition to the effects inherent in the embodiments to which the above structure is not added yet, it is possible to decrease the pressure in the reactor containment vessel by preventing an increase of the quantity of noncondensable gas to be released into the reactor containment vessel, thereby achieving a great effect of decreasing the pressure in the reactor containment vessel.

Figure 20:
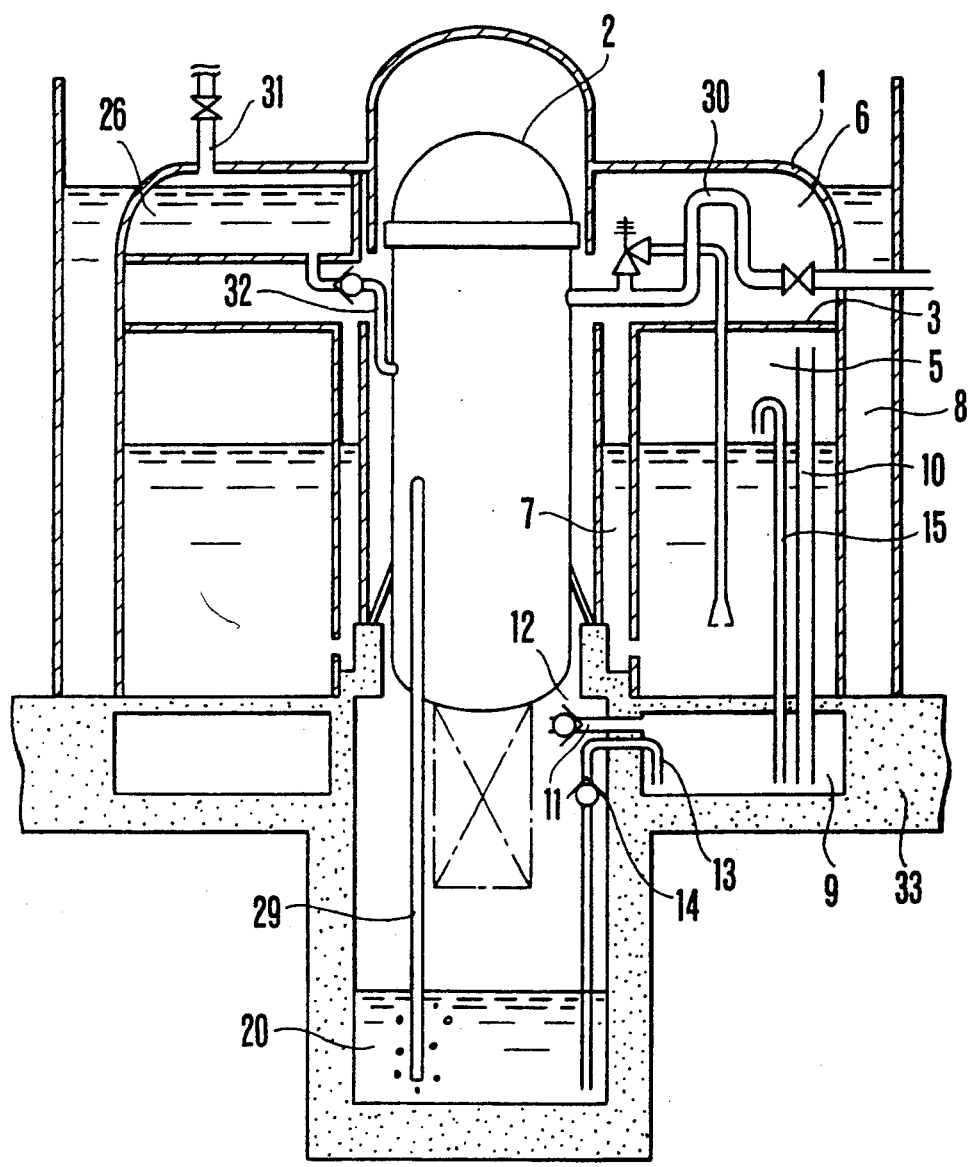
FIG. 20 is a vertical sectional view of a reactor containment vessel in accordance with a twelfth embodiment of the present invention.

A twelfth embodiment of the present invention will be described with reference to FIG. 20.

The present embodiment is applicable to the embodiments shown in FIGS. 1, 3, 6, 8, 10, 12, 15, 16, 17 and 18. Description will be made here about a representative case in which an additional structure is added to the third embodiment shown in FIG. 6.

The structure added to the third embodiment is a heat pipe 29 extending from the outer peripheral wall of the reactor pressure vessel 2 to the lower dry well space 20 in the dry well 6. The operation limit of the heat pipe 29 is set to be larger than the quantity of decay heat at the time of shutdown of the reactor and smaller than the quantity of heat released from the outer peripheral wall of the reactor pressure vessel 2 in normal operating condition.

Therefore, the heat pipe 29 is prevented from operating in normal operating condition. On the other hand, at the time of an accident, coolant is discharged from the space 9 to the lower dry well space 20. The decay heat from the reactor pressure vessel 2 is transferred to the coolant thus discharged by means of the heat pipe 29. In consequence, due to temperature rise and evaporation of the coolant, the decay heat of the reactor can be removed.

According to the present embodiment, in addition to the effects inherent in the embodiments in which the above additional structure is not provided, it is possible to efficiently remove the decay heat of the reactor from the reactor pressure vessel with use of the heat pipe, thereby attaining an effect of removing efficiently the decay heat.

What is claimed is:

1. A reactor containment comprising: a reactor pressure vessel housed in a dry well of a reactor containment vessel; a vent passage through which steam in said dry well is introduced into coolant accommodated in a pressure suppression chamber of said reactor containment vessel; a closed space formed at a position lower than the level of the normal liquid surface of said coolant; first passage having an inlet opened into said pressure suppression chamber at a level higher than that of the normal liquid surface of said coolant and an outlet opened into said closed space; and a second passage communicating between said closed space and said dry well through a counter flow preventing means for checking the flow directed toward said closed space.

2. A reactor containment according to claim 1, wherein a plurality of second passages are provided, a part of said second passages constituting a siphon.

3. A reactor containment according to claim 1, wherein a plurality of first passages are provided, a part of said first passages constituting a siphon while the other part of said first passages having an inlet opened at higher level than the first-mentioned part of said first passages.

4. A reactor containment according to claim 1, wherein a plurality of first passages each constituting a siphon are provided, at least one of said first passages having a different sectional area from other first passages.

6. A reactor containment according to any one of claims 1 to 5, wherein the bottom of said reactor pressure vessel is disposed in said dry well at a lower position than said closed space.

7. A reactor containment according to any one of claims 1 to 5, wherein a third passage leading from said closed space to a noncondensable gas adsorbing means is provided.

8. A reactor containment according to any one of claims 1 to 5, wherein said counter flow preventing means includes a water tank in which an outlet of said second passage is submerged below the liquid surface thereof and which is opened into said dry well.

9. A reactor containment according to any one of claims 1 to 5, wherein an empty chamber surrounded by baffles is formed in said pressure suppression chamber above the liquid surface of said coolant, said empty chamber being opened at its upper part to an upper gaseous phase region of said pressure suppression chamber.

10. A reactor containment according to any one of claims 1 to 5, wherein a high pressure water pouring means is connected to said reactor pressure vessel through a gas outflow preventing means.

11. A reactor containment according to any one of claims 1 to 5, wherein heat transfer means is provided so as to extend from said reactor pressure vessel to a lower space of said dry well.

12. A reactor containment including a reactor containment vessel in which steam released into a dry well is introduced into coolant in a pressure suppression chamber through a passage so as to be condensed therein, said reactor containment vessel comprising: a first passage through which an increment of coolant due to said condensation is introduced from said pressure suppression chamber into a separate chamber provided at a lower position than said pressure suppression chamber; and a second passage communicating between said separate chamber and said dry well through a counter flow preventing means serving to allow said coolant to flow from said separate chamber into said dry well in accordance with a difference hydrostatic head between the coolant water level in said pressure suppression chamber and the water level in said separate chamber.

13. A reactor containment according to claim 1 or 12, wherein an outer peripheral surface of said reactor containment vessel is in contact with liquid in an outer peripheral pool.

14. An emergency pressure reducing method in a reactor containment having a reactor containment vessel with coolant and gas therein, comprising the steps of: introducing steam released to a dry well into said coolant in a pressure suppression chamber of said reactor containment vessel through a vent passage; condensing said steam in said coolant; introducing said coolant increased due to condensation by the action of gravity and said gas in said pressure suppression chamber by the action of at least one of rise of the water level of said coolant increased due to condensation in said pressure suppression chamber and pressure rise in said pressure suppression chamber due to accumulation of steam and gas, from said pressure suppression chamber into a separate chamber formed at a lower position than said pressure suppression chamber; opening a counter flow preventing means which allows said coolant to flow from said separate chamber toward said dry well in response to a difference in hydrostatic head between the water level of coolant in said pressure suppression chamber and the water level in said separate chamber; and returning said gas and coolant in said separate chamber into a lower part of said dry well.

15. An emergency pressure reducing method in a reactor containment according to claim 14, wherein an outer peripheral surface of said reactor containment vessel is brought into contact with liquid in an outer peripheral pool so as to transfer the heat in said reactor pressure vessel to the liquid in said outer peripheral pool through the outer periphery of said reactor containment vessel.

5. A reactor containment according to claim 2, wherein a plurality of first passages are provided, a part of said first passages constituting a siphon while the outer part of said first passages having an inlet opened at higher level than the first-mentioned part of said first passages.

16. A reactor containment according to claim 15, wherein a plurality of first passages each constituting a siphon are provided, at least one of said first passages having different sectional area from other first passages.

17. A reactor containment according to claim 16, wherein the bottom of said reactor pressure vessel is disposed in said dry well at a lower position than said closed space.

19. A reactor containment according to claim 18, wherein a third passage leading from said closed space to a noncondensable gas absorbing means is provided.

18. A reactor containment according to claim 6, wherein said counter flow preventing means includes a water tank in which an outlet of said second passage is submerged below the liquid surface thereof and which is opened into said dry well.

20. A reactor containment according to claim 19, wherein an empty chamber surrounded by baffles is formed in said pressure suppression chamber above the liquid surface of said coolant, said empty chamber being opened at its upper part to an upper gaseous phase region of said pressure suppression chamber.

21. A reactor containment according to claim 20, wherein a high pressure water pouring means is connected to said reactor pressure vessel through a gas outflow preventing means.

22. A reactor containment according to claim 21, wherein head transfer means is provided so as to extend from said reactor pressure vessel to a lower space of said dry well.

23. A reactor containment according to claim 6, wherein a third passage leading from said closed space to a noncondensable gas absorbing means is provided.

24. A reactor containment according to claim 23, wherein said counter flow preventing means includes a water tank in which an outlet of said second passage is submerged below the liquid surface thereof and which is opened into said dry well.

25. A reactor containment according to claim 24, wherein an empty chamber surrounded by baffles is formed in said pressure suppression chamber above the liquid surface of said coolant, said empty chamber being opened at its upper part to an upper gaseous phase region of said pressure suppression chamber.

26. A reactor containment according to claim 25, wherein a high pressure water pouring means is connected to said reactor pressure vessel through a gas outflow preventing means.

27. A reactor containment according to claim 26, wherein head transfer means is provided so as to extend from said reactor pressure vessel to a lower space of said dry well.

* * * * *